US012215935B2

(12) United States Patent
Krivonak et al.

(10) Patent No.: US 12,215,935 B2
(45) Date of Patent: Feb. 4, 2025

(54) THERMAL MANAGEMENT SYSTEM AND METHOD

(71) Applicant: Transportation IP Holdings, LLC, Norwalk, CT (US)

(72) Inventors: Andrew Louis Krivonak, Erie, PA (US); Patrick Lee Jansen, Schenectady, NY (US); Neil Bradley, Erie, PA (US); Gregory Badders, Erie, PA (US); Mark Zysk, Erie, PA (US); Michael Jay Grutkowski, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 51 days.

(21) Appl. No.: 17/672,930

(22) Filed: Feb. 16, 2022

(65) Prior Publication Data

US 2023/0258420 A1   Aug. 17, 2023

(51) Int. Cl.
*F28F 27/02*        (2006.01)
*F28D 15/00*        (2006.01)
(Continued)

(52) U.S. Cl.
CPC .............. *F28F 27/02* (2013.01); *F28D 15/00* (2013.01); *F28F 9/026* (2013.01); *G05D 7/0641* (2013.01);
(Continued)

(58) Field of Classification Search
CPC ........... F28F 27/02; F28F 9/026; F28D 15/00; H01M 10/613; H01M 10/6556; H01M 10/6568; G05D 7/0641; G05D 23/1917
See application file for complete search history.

(56) References Cited

U.S. PATENT DOCUMENTS 9,273,906 B2 *   3/2016   Goth ................. H05K 7/20836
9,893,392 B2 *   2/2018   Vanderwees .......... H01M 50/00
(Continued)

FOREIGN PATENT DOCUMENTS

DE   102014203644 A1   9/2015
EP       3243240 A1   11/2017
WO     2021099739 A1    5/2021

OTHER PUBLICATIONS

Extended European Search Report for corresponding EP Application No. 23153181.5-1002 dated Jul. 13, 2023 (8 pages).

*Primary Examiner* — Raheena R Malik
(74) *Attorney, Agent, or Firm* — K&L Gates LLP

(57) ABSTRACT

A thermal management system and a method of operating thereof includes a housing body having a first broad surface and an opposing second broad surface and may extend between a first end and a second end. The housing body defines plural passages disposed between the first and second broad surfaces. The plural passages extend in one or more orthogonal directions between the first and second ends of the body. An inlet conduit is fluidly coupled with a first passage of the plural passages via an inlet structure that defines an inlet of the housing body, and directs a fluid into the first passage of the plural passages. An outlet conduit is fluidly coupled with a second passage of the plural passages via an outlet structure that defines an outlet of the housing body, and directs the fluid out of the second passage of the plural passages.

19 Claims, 12 Drawing Sheets

(51) Int. Cl.
*F28F 9/02* (2006.01)
*G05D 7/06* (2006.01)
*G05D 23/19* (2006.01)
*H01M 10/613* (2014.01)
*H01M 10/6556* (2014.01)
*H01M 10/6568* (2014.01)

(52) U.S. Cl.
CPC ...... *G05D 23/1917* (2013.01); *H01M 10/613* (2015.04); *H01M 10/6556* (2015.04); *H01M 10/6568* (2015.04)

(56) References Cited

U.S. PATENT DOCUMENTS

| | | | |
|---|---|---|---|
| 10,923,788 B1* | 2/2021 | Loveness | H01M 10/6557 |
| 11,408,790 B2* | 8/2022 | Le Henaff | G01L 19/0084 |
| 2005/0200001 A1* | 9/2005 | Joshi | F28F 3/08 |
| | | | 257/714 |
| 2012/0107663 A1* | 5/2012 | Burgers | H01M 10/6556 |
| | | | 429/120 |
| 2014/0090810 A1* | 4/2014 | Schmid | F28F 3/12 |
| | | | 165/104.19 |
| 2014/0162107 A1* | 6/2014 | Obrist | H01M 10/617 |
| | | | 165/46 |
| 2016/0036104 A1* | 2/2016 | Kenney | F28F 3/12 |
| | | | 165/170 |
| 2017/0271726 A1* | 9/2017 | Shen | H01M 10/653 |
| 2017/0335748 A1* | 11/2017 | Zhang | F02D 41/0065 |
| 2020/0227794 A1* | 7/2020 | Mazza | H01M 10/6567 |
| 2020/0240721 A1* | 7/2020 | Kenney | F28D 1/035 |
| 2020/0373638 A1* | 11/2020 | Lee | H01M 10/6572 |
| 2021/0122263 A1* | 4/2021 | Dziubinschi | H01M 10/625 |
| 2021/0135175 A1* | 5/2021 | An | H01M 50/224 |
| 2021/0135307 A1* | 5/2021 | Bruneau | H01M 10/6555 |
| 2022/0271367 A1* | 8/2022 | Person | H01M 10/6555 |
| 2022/0276008 A1* | 9/2022 | Thompson | F24F 11/30 |
| 2023/0258420 A1* | 8/2023 | Krivonak | H01M 10/6568 |
| | | | 165/101 |

* cited by examiner

THERMAL MANAGEMENT SYSTEM AND METHOD

BACKGROUND

Technical Field

The subject matter described herein relates to thermal management systems and methods.

DISCUSSION OF ART

Power systems may include thermal energy generating devices that may need to be thermally controlled. For example, a battery of a vehicle system may generate thermal energy that may need to be controlled by a heat exchanger or other thermal control device. In certain thermal generating systems, air may be directed across surfaces of the thermal energy generating devices to exchange thermal energy with the devices. In order to exchange thermal energy between the air and the devices, the thermal energy generating devices may need to be separated from each other, or from other devices or systems, to allow a sufficient amount of space through which the air may move. The amount of air, and the size of spaces through which the air may need to move, may be based on the different amounts of thermal energy generated by the devices.

In other thermal generating systems, the thermal energy generating devices may be housed or disposed within a common housing, and the housing may need to be sufficiently sized to maintain positions of the devices, provide openings or passages through which a coolant may be directed, and fit within an available space of the power system. For example, a vehicle system may have a limited space available in which the housing may be positioned, the limited space may have an unusual shape and/or size, or the like.

A need exists for a thermal management system which is different than existing systems and methods.

BRIEF DESCRIPTION

In one aspect or example, a thermal management system may include a housing body having a first broad surface and an opposing second broad surface and extending between a first end and a second end. The housing body may define plural passages disposed between the first and second broad surfaces. The plural passages may extend in one or more orthogonal directions between the first end and the second end of the body. An inlet conduit may be fluidly coupled with a first passage of the plural passages via an inlet structure that defines an inlet of the housing body. The inlet conduit may direct a fluid into the first passage of the plural passages. An outlet conduit may be fluidly coupled with a second passage of the plural passages via an outlet structure that defines an outlet of the housing body. The outlet conduit may direct the fluid out of the second passage of the plural passages.

In one aspect or example, a method may include controlling one or more characteristics of a fluid directed into a first passage of plural passages. The plural passages may be defined by a housing body having a first broad surface and an opposing second broad surface and extending between a first end and a second end. The plural passages may extend in one or more directions between the first and second ends. One or more characteristics of the fluid directed out of the second passage of the plural passages may be controlled. The second passage being fluidly coupled with the first passage.

In one aspect or example, a thermal management system may include a housing body having a first broad surface and an opposing second broad surface and extending between a first end and a second end. The housing body may define plural passages disposed between the first and second broad surfaces. The plural passages may extend in one or more directions between the first end and the second end of the body. The housing body may selectively secure one or more devices in a determined position of the one or more devices. The one or more devices may be thermally coupled with one or more of the first broad surface or the second broad surface wherein fluid moving within the plural passages exchanges thermal energy with the one or more device. An inlet conduit may be fluidly coupled with a first passage of the plural passages via an inlet structure that defines an inlet of the housing body. The inlet conduit may direct the fluid into the first passage of the plural passages. An outlet conduit may be fluidly coupled with a second passage of the plural passages via an outlet structure that defines an outlet of the housing body. The outlet conduit may direct the fluid out of the second passage of the plural passages. A controller may receive sensor data indicative of thermal conditions of one or more of the housing body or the one or more devices. The controller may control one or more characteristics of the fluid directed into the first passage via the inlet conduit and the fluid directed out of the second passage via the outlet conduit based on the thermal conditions of the one or more of the housing body or the one or more devices.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
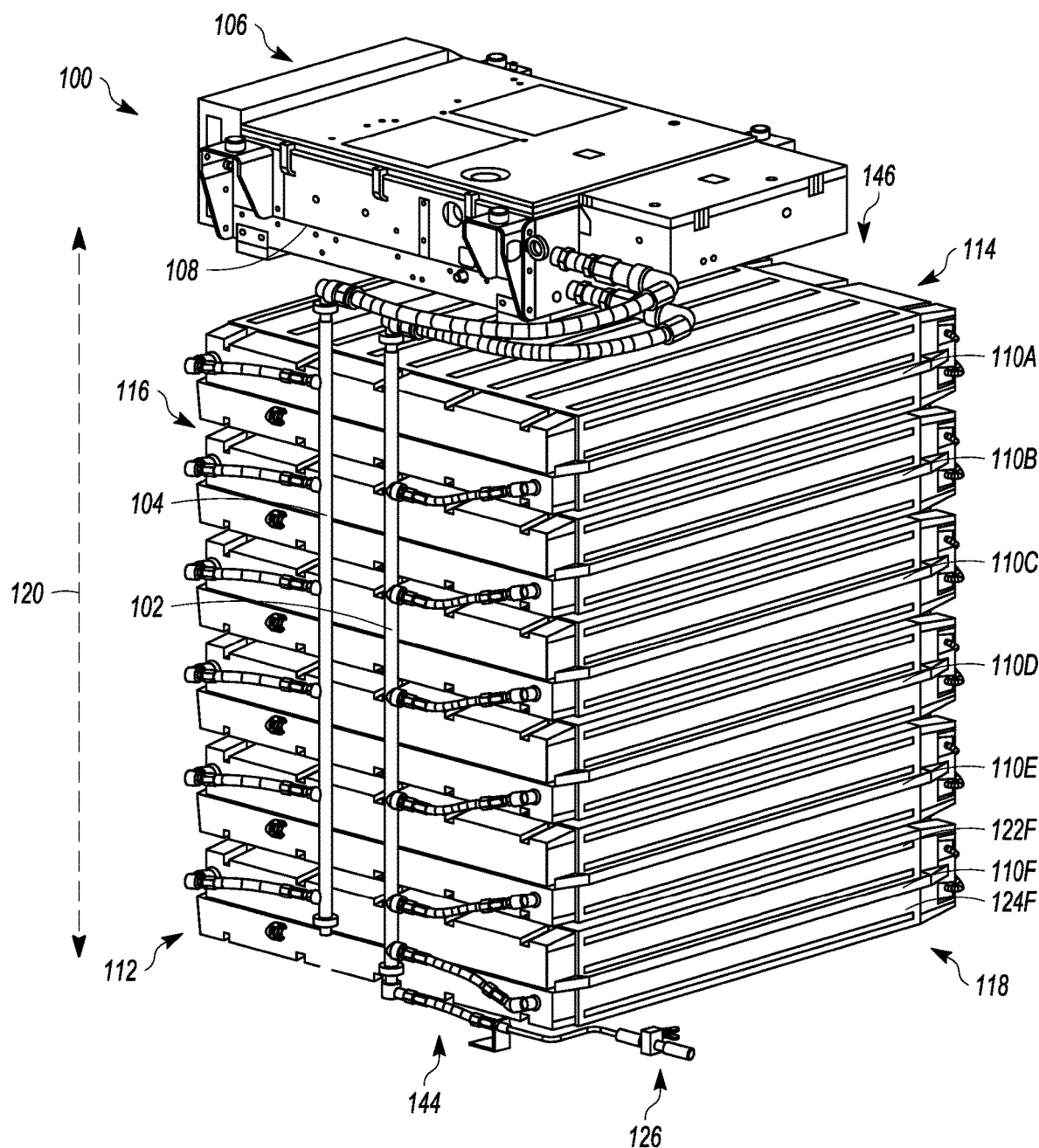
FIG. 1 illustrates a perspective view of a thermal management system in accordance with one embodiment.

Embodiments of the subject matter described herein relate to a thermal management system and method of operation. The thermal management system may be used within a power system, such as a power generating system (e.g., a vehicle, a stationary power generating system, or the like) to control thermal conditions of the power system. The thermal management system may include one or more housing bodies with plural passages disposed within the housing bodies. The plural passages may extend in one or more different directions within each of the one or more housing bodies, and a fluid may be directed toward different locations or areas within the housing bodies.

In one or more embodiments, one or more devices may be thermally and/or operably coupled with one or more of the housing bodies. The devices may be used by a power system in which the thermal management is disposed. The devices may provide power to the system, may be processors or circuits of the system, may be energy storage devices of the system, or the like. The fluid may be directed within the housing bodies to control thermal conditions of the housing body, such as based on the thermal energy generated by the one or more devices. The shape, size, orientation, and configuration of the plural passages may be based on different amounts of thermal energy disposed at different locations of the housing bodies, based on different amounts of thermal energy generated by the one or more devices, based on a proximity of the devices with one or more surfaces of the housing bodies, or the like.

In one or more embodiments, the one or more housing bodies may be aligned with each other in a direction, such as a vertical direction or a horizontal direction. The thermal management system may be referred to as a modular type of thermal management system, such that the number of housing bodies may be based on the thermal conditions of the power system, a number of different devices that may require thermal control, or the like. For example, for a power system that has or includes a single battery, the power system may include a thermal management system that includes a single housing body with passages extending within the housing body to direct the fluid within the housing body toward locations of the housing body that may receive thermal energy from the battery.

As another example, the power system may include plural batteries, and each of the plural batteries may generate thermal energy. The thermal management system may include plural housing bodies that may be vertically aligned with each other. Each of the plural batteries may be thermally coupled with one or more of the housing bodies, and the fluid may be directed within the one or more housing bodies based on the different amounts of thermal energy generated by each of the different batteries. In one or more embodiments, one or more of the housing bodies may be added to, or removed from, the thermal management system after the power system has been in operation. For example, one or more devices may be retrofitted with the power system, and one or more corresponding housing bodies may be retrofitted with the thermal management system. The additional housing bodies may be used to control the thermal conditions of the power system based on the additional thermal energy generated by the additional devices retrofitted with the power system.

In one embodiment, the thermal management system may be used to control thermal conditions of a power system. The power system may be a vehicle system, a mechanical system, an electrical system, a propulsion system, or the like. The vehicle system may be a rail vehicle, an automobile, a truck (with or without a trailer), a bus, a marine vessel, an aircraft, a mining vehicle, an agricultural vehicle, or other off-highway vehicle. Optionally, the thermal management system may be used to control thermal conditions of a stationary or other non-vehicle power system. The vehicle systems described herein (rail vehicle systems or other vehicle systems that do not travel on rails or tracks) can be formed from a single vehicle or multiple vehicles, and optionally the operating system may extend between two or more of the multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

Figure 2:
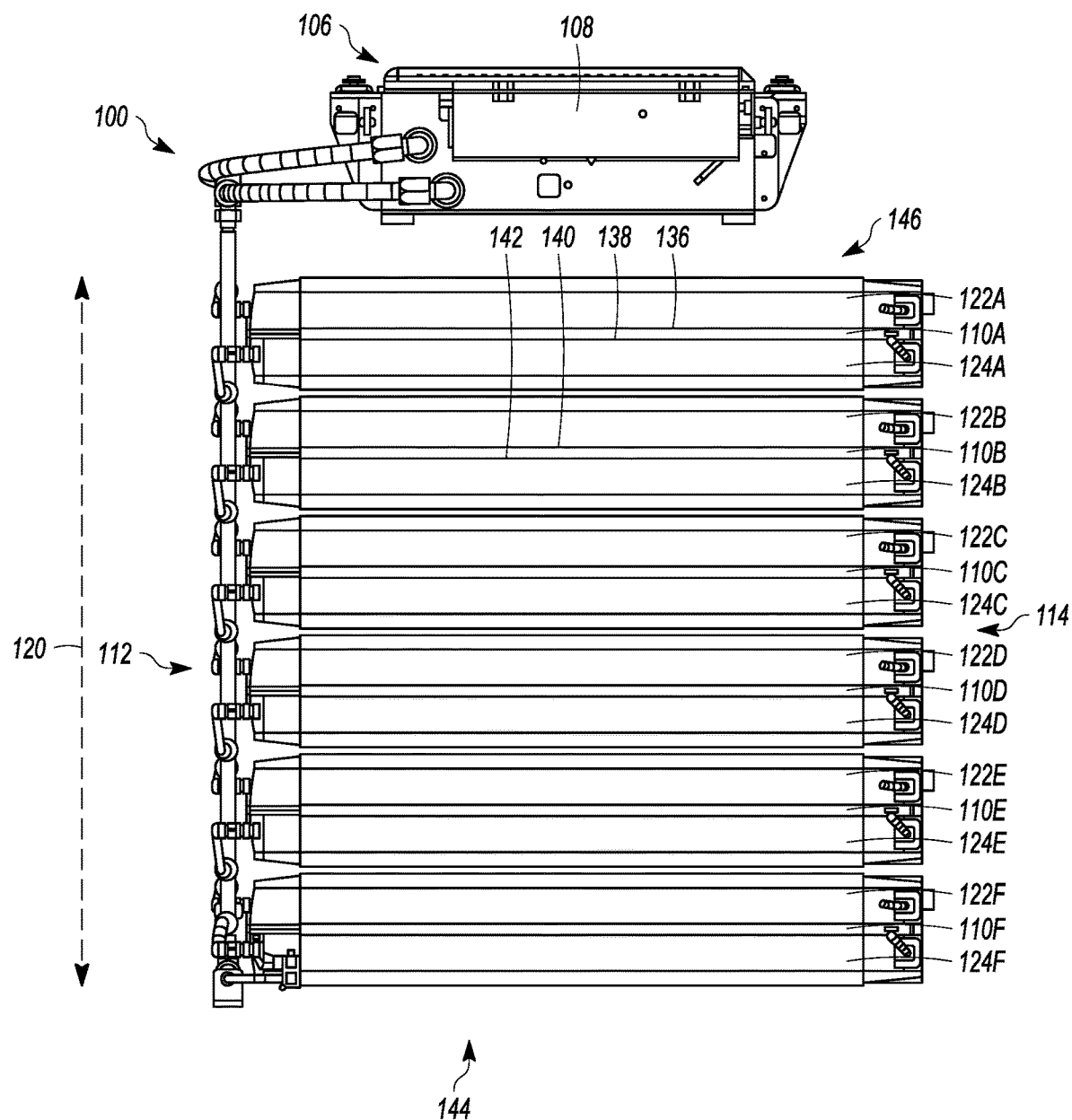
FIG. 2 illustrates a side view of the thermal management system shown in FIG. 1.
Figure 3:
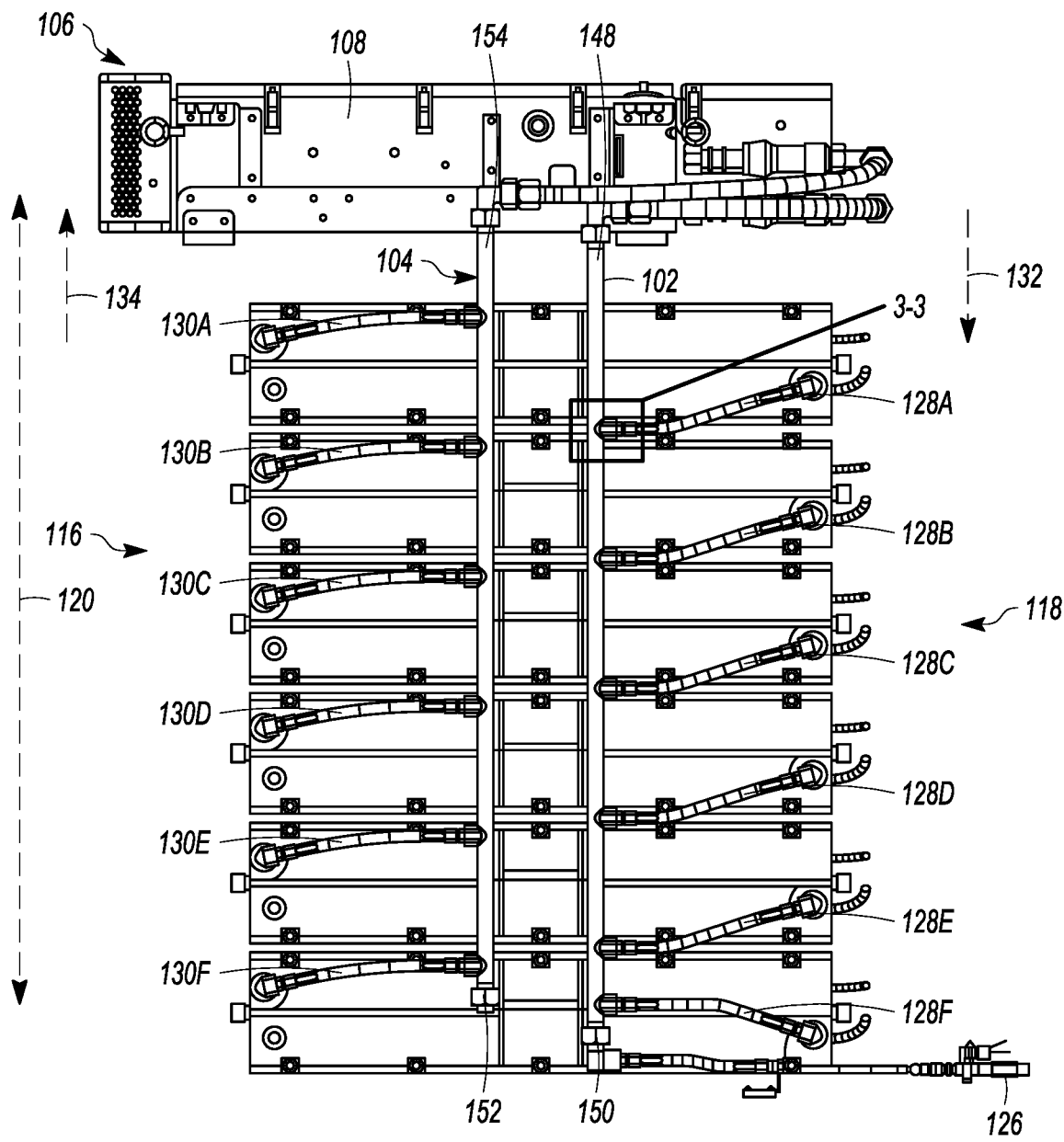
FIG. 3 illustrates a front view of the thermal management system shown in FIG. 1.

FIG. 1 illustrates one example of a thermal management system 100 in accordance with one embodiment. FIG. 2 illustrates a side view of the thermal management system, and FIG. 3 illustrates a front view of the thermal management system. FIGS. 1 through 3 will be discussed together herein. The thermal management system may be disposed within a vehicle system such as a rail vehicle, an automobile, a truck (with or without a trailer), a bus, a marine vessel, an aircraft, a mining vehicle, an agricultural vehicle, or other off-highway vehicle. Optionally, the thermal management system may be disposed within a non-vehicle and/or stationary power system such as a wind-powered turbine, manufacturing machinery, power generating systems, or the like. For example, the thermal management system may be used to control thermal energy that may be generated by a system to which the thermal management system is thermally coupled.

The thermal management system may include one or more housing bodies 110A-F. In the illustrated embodiment, each of the housing bodies extend between a first end 112 and an opposing second end 114, a third end 116 and an opposing fourth end 118. In the illustrated embodiment, each of the housing bodies include two broad surfaces that extend between the first, second, third, and fourth ends. The housing bodies are planar with each other, and are aligned with each other in a vertical direction 120 between a top side 146 and a bottom side 144 of the thermal management system. For example, as illustrated in FIG. 2, a first housing body 110A may include a first broad surface 136 and an opposite second broad surface 138. A second housing body 110B may be vertically aligned with the first housing body. The second housing body may include a third broad surface 140 and a fourth broad surface 142. The first broad surface of the first housing body faces away from the second housing body, and the second broad surface of the first housing body faces toward the second housing body. Additionally, the second broad surface faces toward the third broad surface of the second housing body, and the fourth broad surface of the second housing body faces away from the first housing body in the vertical direction. In the illustrated embodiment, each of the housing bodies have substantially the same shape, size, and orientation as each of the other housing bodies. Alternatively, one or more of the housing bodies may have a shape, size, orientation, rotational positioning, or the like, relative to one or more other housing bodies.

Figure 6:
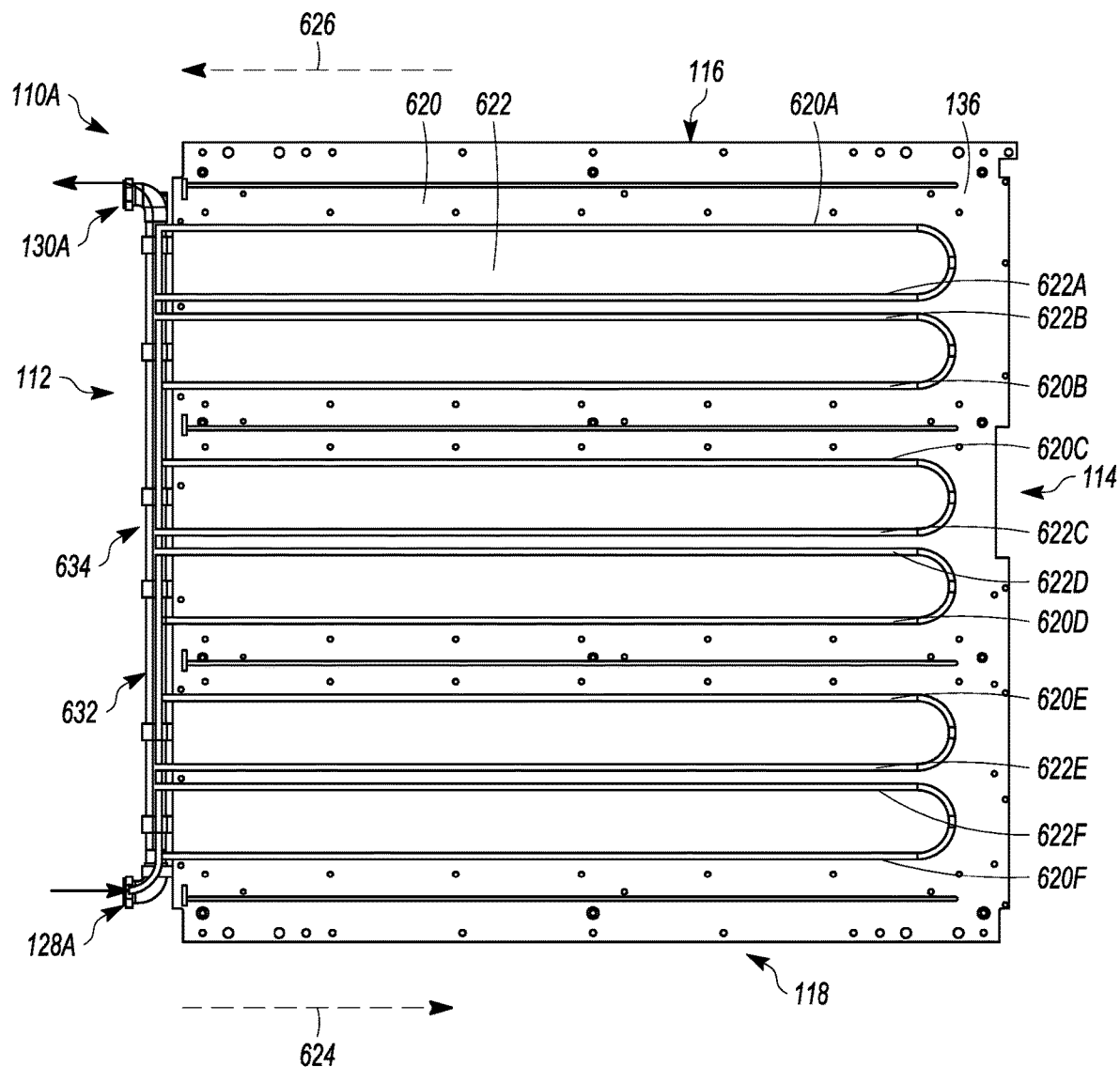
FIG. 6 illustrates a top cross-sectional view of a housing body of a thermal management system in accordance with one embodiment.

The housing bodies may include and/or define plural passages that may extend in one or more directions within the housing bodies between the broad surfaces and the first, second, third, and fourth ends. In one or more embodiments, the passages may be machined, extruded, or otherwise formed within the housing bodies. A fluid may be directed within the plural passages to control thermal conditions of the one or more housing bodies. The fluid may be a liquid fluid, a gaseous fluid, a liquid-gas mixture, or the like. The fluid may be water, ambient air, a coolant, or the like. FIG. 6 illustrates a top cross-sectional view of the first housing body 110A of the thermal management system in accordance with one embodiment. The housing body defines plural passages 620, 622 disposed within the housing body between the first and second broad surfaces of the housing body. The plural passages may extend in one or more orthogonal directions within the housing body.

In the illustrated embodiment, the passages are arranged to direct the fluid in a third direction 624 from the first end of the housing body toward the second end of the housing body, and in a fourth direction 626 from the second end of the housing body toward the first end. For example, the passages are arranged in a loop-like configuration to direct the fluid to different locations within the housing body. Optionally, the passages may be arranged in an alternative pattern and/or random configuration. For example, the arrangement of the passages may be based on thermal conditions of the housing body. In one embodiment, the housing body may have substantially uniform thermal conditions along the first broad surface of the housing body, and the passages may be arranged to direct fluid in a substantially uniform arrangement within the housing body based on the substantially uniform conditions. In another embodiment, the housing body may have non-uniform thermal conditions at different locations along the first broad surface, and the passages may be arranged in a non-patterned or random arrangement based on the non-uniform thermal conditions.

In the illustrated embodiment, the housing body includes a first group of plural first passages 620A-F that direct the fluid in the third direction, and a second group of plural second passages 622A-F and direct the fluid in the fourth direction. The first group of the plural first passages are fluidly coupled with the corresponding second passages of the second group. For example, the first passages may direct a portion of the fluid toward a location of the housing body to exchange thermal energy located and/or generated proximate to the location, and the second passages may direct the fluid out of the housing body. In one embodiment, the fluid directed out of the housing body having a different temperature than the fluid directed into the housing body. For example, the fluid moving within the first passages may have a temperature that is less than the fluid moving within the second passages based on the fluid moving within the second passages having exchanged thermal energy with the housing body.

Each of the first passages are fluidly coupled with the inlet structure via an inlet feeding passage 632. For example, the inlet structure and the inlet feeding passage fluidly couple the inlet conduit with each of the first passages. In the illustrated embodiment, the inlet feeding passage extends along the first end of the housing body a length that is less than a length of the first broad surface between the third and fourth ends of the housing body. For example, the inlet feeding passage extends a length that is about the same or less than a width of the thermal management system. The inlet feeding passage may have a uniform or varying shape and/or size along the length of the inlet feeding passage to control characteristics of the portion of the fluid being directed into each of the different first passages 620A-F.

The plural second passages 622A-F are fluidly coupled with the outlet structure via an outlet feeding passage 634. For example, the outlet structure and the outlet feeding passage fluidly couple the outlet conduit with each of the second passages. In the illustrated embodiment, the outlet feeding passage extends a length along the first end of the housing body that is about the same as the length of the inlet feeding passage. Optionally, the inlet and outlet feeding passages may extend different lengths relative to each other. The outlet feeding passage may have a substantially uniform shape and/or size along the length of the outlet feeding passage, or may have a varying shape and/or size along the length of the outlet feeding passage. The uniform and/or varying shape or size of the outlet feeding passage may be arranged to control characteristics of the portion of the fluid being directed out of each of the different second passages 622A-F.

In one or more embodiments, one of the feeding passages may extend along a different end of the housing body, such as the second, third, or fourth ends, and the first and/or second passages may be arranged within the housing body to direct the portion of the fluid from and/or towards the inlet or outlet feeding passages extending along the different end of the housing body. For example, the inlet feeding passage may extend along the first end of the housing body and direct the fluid into the first passages in the third direction, and the outlet feeding passage may extend along the second end of the housing body, and direct the fluid out of the second passages in the same third direction.

Figure 7:
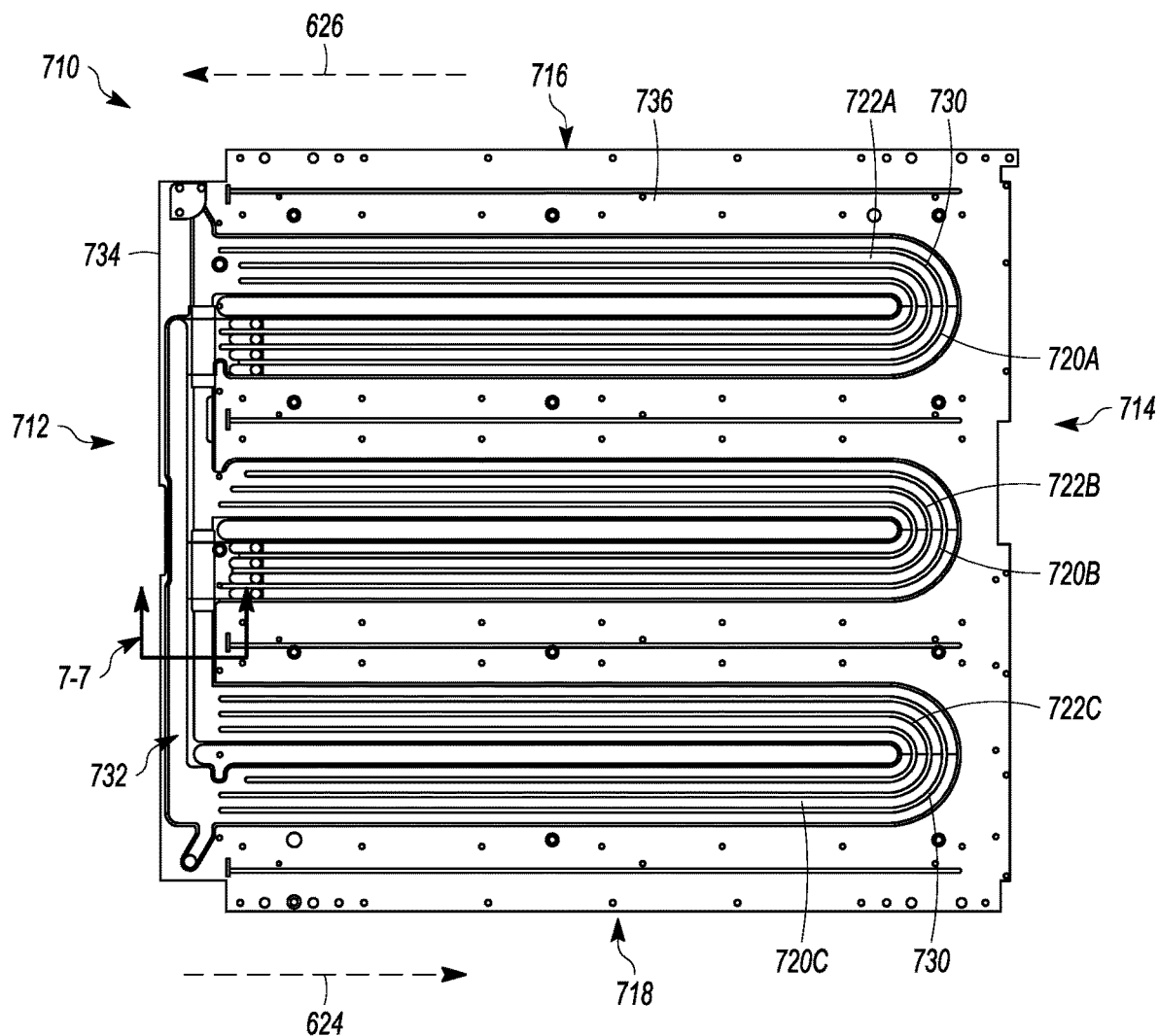
FIG. 7 illustrates a top view of a housing body of a thermal management system in accordance with one embodiment.

In one or more embodiments, the plural passages disposed within the housing body may have an alternative arrangement. For example, FIG. 7 illustrates a top cross-sectional view of a housing body 710 of a thermal management system in accordance with one embodiment. The housing extends between a first end 712 and an opposing second end 714, a third end 716 and an opposing fourth end 718. The housing body defines plural passages 720, 722 disposed within the housing body and extending in plural different orthogonal directions within the housing body. In the illustrated embodiment, some of the passages (e.g., passages 720A, 720B, 720C) are arranged to direct the fluid in the third direction 624 from the first end of the housing body toward the second end of the housing body. Additionally, some of the passages (e.g., passages 722A, 722B, 722C) are arranged to direct the fluid in the fourth direction 626 from the second end toward the first end of the housing.

In one embodiment, the passages 720A, 720B, 720C may be referred to as first passages or inlet passages that direct the fluid in the third direction, such as toward a location of the housing body to exchange thermal energy at the location. The passages 722A, 722B, 722C may be referred to as second passages or outlet passages and one or more of the second passages may be fluidly coupled with one or more of the first passages. For example, the second passages may direct the fluid in the fourth direction and in a direction out of the housing body (e.g., after the fluid exchanges thermal energy with devices thermally coupled with the housing body). For example, the portion of the fluid moving within the first passages may have a temperature that is less than the portion of the fluid moving within the second passages.

In the illustrated embodiment, each of the passages 720, 722 include one or more structures 730 that separate and define plural sub-passages extending therein within the passages 720, 722. For example, the first passage 720A and the second passage 720B may each be separated into sub-passages via plural structures 730 that separate each of the plural sub-passages from each other. The structures may be shaped, sized, and positioned to control one or more characteristics of the portion of the fluid moving within the first passage 720A, and the portion of the fluid moving within the second passage 722A. In the illustrated embodiment, each of the first passages and each of the second passages are separated or divided into, or include four sub-passages defined by the structures, but alternatively one or more of the first or second passages may include structures that divide the first or second passages, respectively, into less than four or more than four sub-passages.

Figure 8:
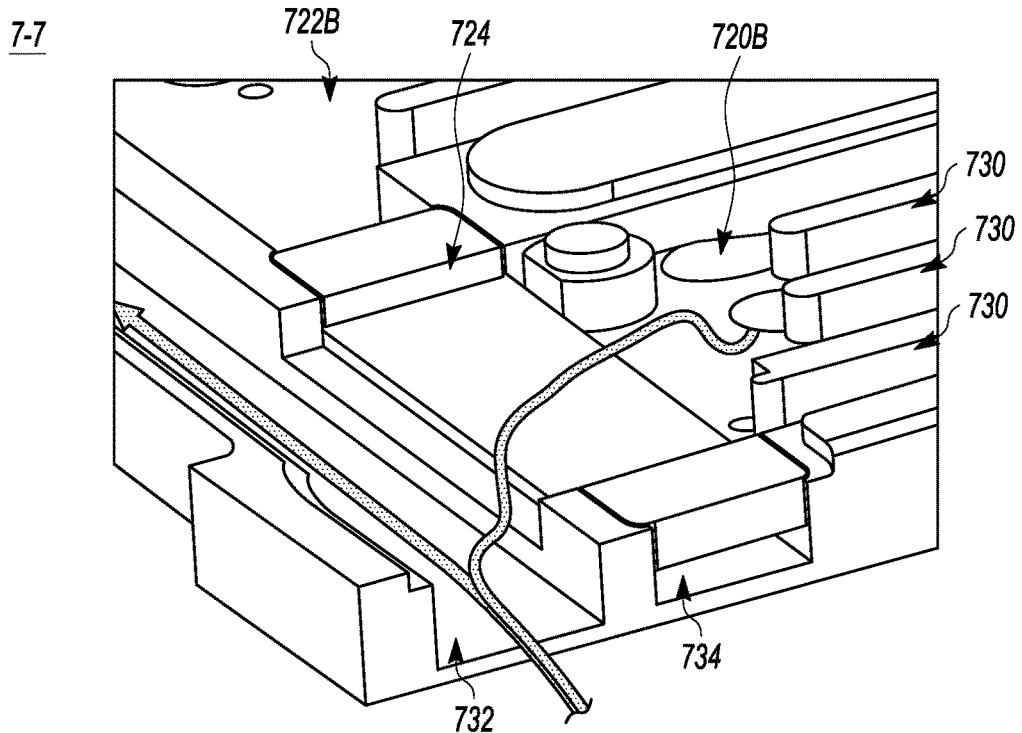
FIG. 8 illustrates a partial cross-sectional perspective view of the housing body shown in FIG. 7.
Figure 9:
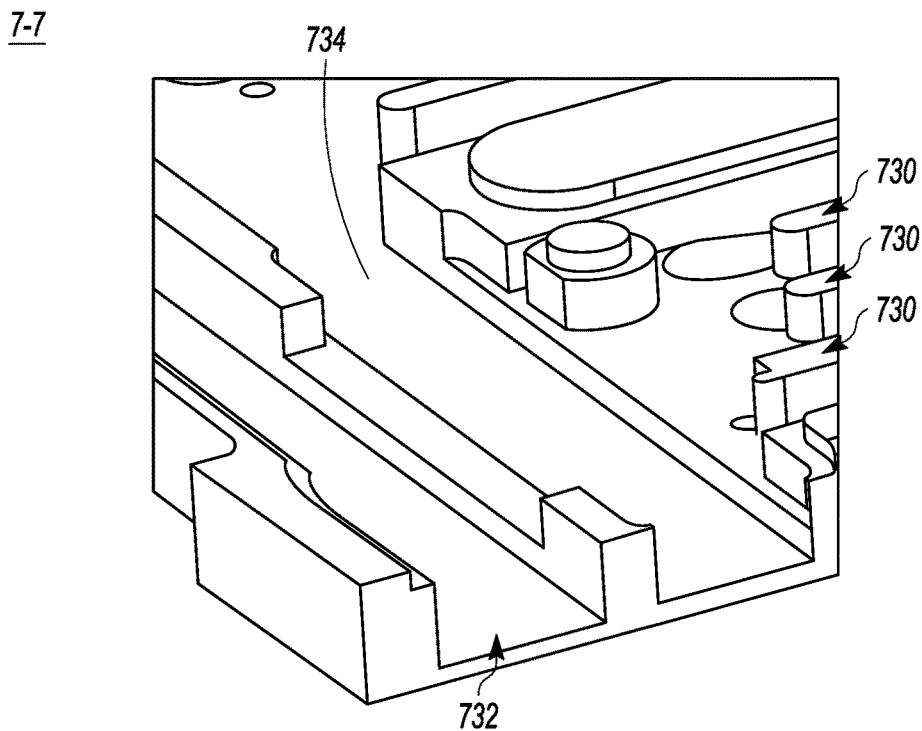
FIG. 9 illustrates a partial cross-sectional perspective view of the housing body shown in FIG. 7.

Each of the first passages may be fluidly coupled with the inlet structure (not shown) via an inlet feeding passages 732, and each of the second passages may be fluidly coupled with the outlet structure (not shown) via an outlet feeding passage 734. In the illustrated embodiment, the inlet and outlet feeding passages each extend a length between the third and fourth ends of the housing body in a direction that is substantially parallel with a direction of elongation of the first and second ends of the housing body. FIG. 8 illustrates a cross-sectional perspective view 7-7 of a portion of the housing body shown in FIG. 7 in accordance with one embodiment, and FIG. 9 illustrates the cross-sectional perspective view 7-7 of the portion of the housing body shown in FIG. 8 in accordance with another embodiment. In the illustrated embodiments of FIGS. 8 and 9, the inlet feeing passage 732 is fluidly coupled with the sub-passages of the first passage 720B, and the outlet feeding passage is fluidly coupled with the sub-passages of the second passage 722B. As illustrated in FIG. 8, the housing body includes a flow bridge 724 that allows the portion of the fluid to be directed from the inlet feeding passage toward the first passage without interfering with the outlet feeding passage. For example, the portion of the fluid directed into the housing body is separated from the portion of the fluid directed out of the housing body via the flow bridge. The flow bridge is hidden from view in FIG. 9.

In the illustrated embodiment, the flow bridge directs the portion of the fluid from the inlet feeding passage over the top of the outlet feeding passage. Alternatively, the flow bridge may be configured to direct the portion of the fluid from the inlet feeding passages under the outlet feeding passage. For example, the portion of the fluid moving within the outlet feeding passage may move over the top of the inlet feeding passage and/or the first passages. Optionally, the housing body may include one or more flow bridges that have any alternative shape, size, and/or orientation to keep separate the portion of the fluid moving within the inlet feeding passage and/or the first passages from the portion of the fluid moving within the outlet feeding passage and/or the second passages. In one or more embodiments, the housing body may include a number of flow bridges that correspond to the number of first passages, that correspond to the number of second passages, or the like.

In one or more embodiments, the different housing bodies of the thermal management system (e.g., the housing bodies shown in FIGS. 1 through 3) may include passages that have substantially the same or different configurations. For example, the different housing bodies may have passages with flow paths as illustrated in FIGS. 6 and/or 7, or alternatively may have passages with flow paths extending in different directions between broad surfaces of the housing bodies. In one embodiment, a first housing body (e.g., first housing body 110A) may include a first set of plural passages, and a second housing body (e.g., second housing body 110B) may include a second set of plural passages. The second set of the plural passages may be arranged in substantially the same configuration as the first set, or may be arranged in a different configuration. For example, the first set of the plural passages may have an arrangement such as the arrangement shown in FIG. 6, and the second set of the plural passages may have an arrangement such as the arrangement shown in FIG. 7. In one or more embodiments, the first housing body may include a first number of plural passages, and the second housing body may include a different, second number of plural passages. Optionally, the first set of plural passages extending within the first housing body may be shaped and/or sized in order to direct a first volume of fluid within the first housing body, and the second set of the plural passages extending within the second housing body may be shaped and/or sized in order to direct a different, second volume of fluid within the second housing body.

Returning to FIGS. 1-3, in one or more embodiments, the thermal management system may include a fluid reservoir housing 108. The fluid reservoir housing may include one or more chambers (not shown) disposed within the fluid reservoir housing that may contain the fluid. The fluid may be directed out of one of the chambers of the fluid reservoir housing and toward an inlet conduit 102, and may be received within one of the chambers via an outlet conduit 104. The inlet conduit and the outlet conduit extend in the same vertical direction as the stacked housing bodies. In the illustrated embodiment, the inlet conduit directs the fluid out of the fluid reservoir housing in a first direction 132, and the outlet conduit directs the fluid toward the fluid reservoir housing in a second direction 134 that is substantially opposite the first direction. Optionally, the fluid may be directed into the inlet conduit from another system or from another location, the fluid may be directed out of the outlet conduit toward another system or another location, or the like. In one or more embodiments, the inlet conduit and/or the outlet conduit may be shaped, sized, and/or oriented to control characteristics of portions of the fluid directed into and/or out of the first set of the plural passages disposed within the first housing body, and control characteristics of portions of the fluid directed into and/or out of the second set of the plural passages disposed within the second housing body.

In the illustrated embodiment, the inlet conduit and the outlet conduit are fluidly coupled with the plural passages of each of the housing bodies via inlet structures 128A-F and outlet structures 130A-F, respectively. For example, each inlet structure directs a portion of the fluid from the inlet conduit and toward the passages of the corresponding housing body, and the outlet structure directs the portion of the fluid from the passages of the corresponding housing body and toward the outlet conduit. In the illustrated embodiment, the inlet and outlet structures extend in directions that are substantially perpendicular to the vertical direction in which the inlet and outlet conduits extend. The inlet conduit extends between a first end 148 and a second end 150, and extends a length that may be based on a placement or positioning of each of the inlet structures 128A-F. For example, the inlet conduit may extend a length that allows each of the inlet structures to be coupled with the inlet conduit and receive a portion of the fluid from the inlet conduit. Additionally, the outlet conduit extends between a first end 152 and a second end 154 and may extend a length that allows each of the outlet structures to be coupled with the outlet conduit and direct a portion of the fluid toward the outlet conduit.

Figure 4:
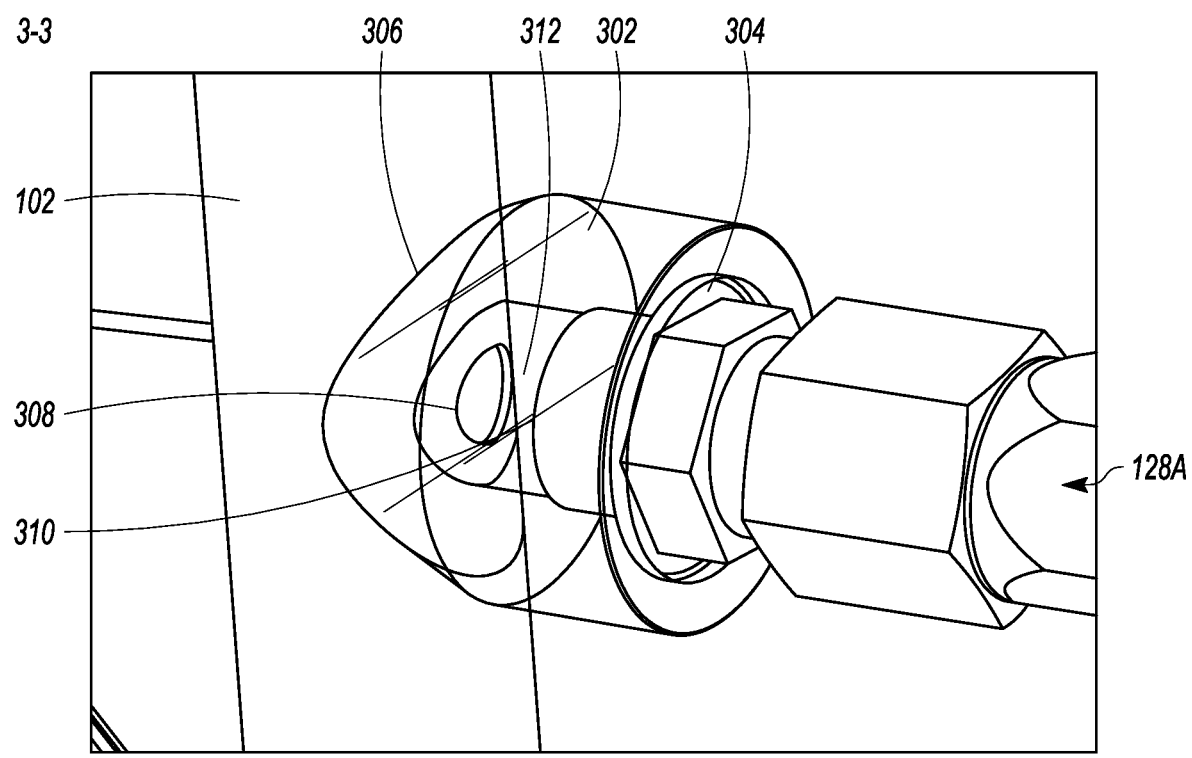
FIG. 4 illustrates a magnified view of a portion of the thermal management system shown in FIG. 1.

The inlet structures may be coupled with the inlet conduit within one or more couplers to control characteristics of the fluid moving from the inlet conduit and through each of the different inlet structures. For example, FIG. 4 illustrates a magnified view 3-3 of an inlet structure 128A of the thermal management system shown in FIG. 3 in accordance with one embodiment. The inlet structure is coupled with the inlet conduit such that the inlet structure fluidly couples the inlet conduit with the passages of the first housing body 110A of the thermal management system. The inlet structure is coupled with the inlet conduit via a coupler 302 that extends between a first end 304 and a second end 306. The first end of the coupler is disposed at and coupled with an end of the inlet structure, and the second end of the coupler is disposed at and coupled with a portion of the inlet conduit. The coupler includes one or more interior surfaces that define a space 312 or void within the coupler. The space extends between an opening 308 of the inlet conduit and an opening 310 of the inlet structure. In one or more embodiments, the coupler between a first inlet structure and the inlet conduit may be the same (e.g., same shape, size, or the like) or different than a coupler disposed between a second inlet structure and the inlet conduit. The coupler may be used to control characteristics of the fluid moving from the inlet conduit, through the coupler, and into the corresponding inlet structure. For example, the coupler may be used to maintain substantially uniform flow characteristics of the fluid moving from the inlet conduit through each of the inlet structures toward each of the corresponding housing bodies. Optionally, the inlet structure may be fluidly coupled with the inlet conduit via an alternative coupler having an alternative configuration to control one or more characteristics of the fluid moving within the thermal management system.

Figure 5:
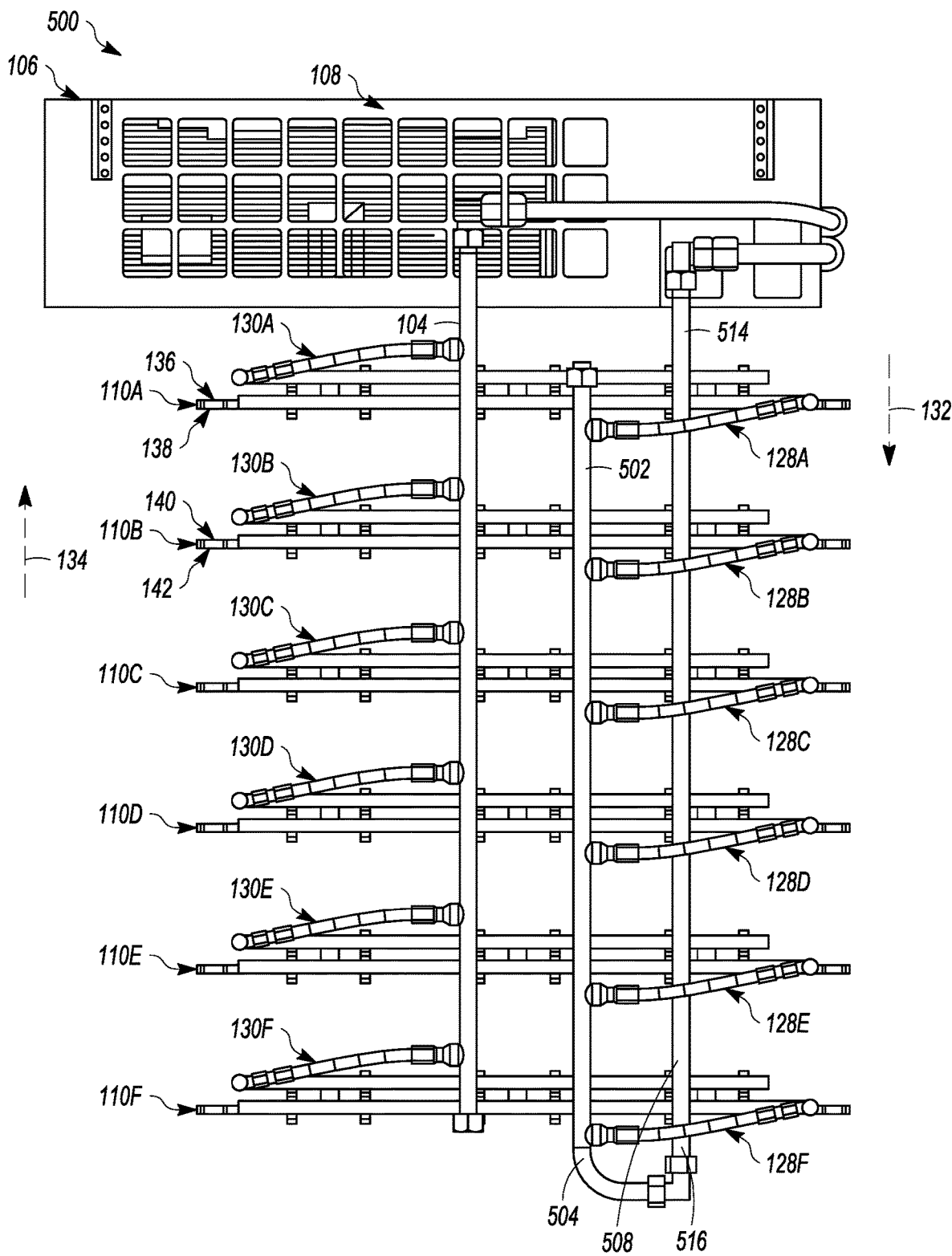
FIG. 5 illustrates a partial view of a thermal management system in accordance with one embodiment.

In one or more embodiments, the inlet conduit may be fluidly coupled with the fluid reservoir housing via an alternative configuration. For example, FIG. 5 illustrates a thermal management system 500 in accordance with one embodiment. The thermal management system includes the plural housing bodies 110A-F that are vertically aligned with each other. For example, the first broad surface of the first housing body faces away from the second housing body, and the second broad surface of the first housing body faces toward the third broad surface of the second housing body.

Like the thermal management system shown in FIGS. 1-3, the thermal management system includes the fluid reservoir housing, the plural housing bodies, the outlet conduit, and plural outlet structures fluidly coupling the housing bodies with the outlet conduit. The thermal management system includes a feeder conduit 508 that is fluidly coupled with the fluid reservoir housing and an inlet conduit 502. For example, a first end 514 of the feeder conduit is coupled with the fluid reservoir housing, and a second end 516 of the feeder conduit is coupled with a first end 504 of the inlet conduit.

The feeder conduit is oriented to direct the fluid out of the fluid reservoir housing in the first direction 132 toward the inlet conduit. The fluid moves within the inlet conduit in the second direction 134 toward the fluid reservoir housing. For example, the inlet conduit directs the fluid to move in the second direction and toward each of the plural inlet structures (e.g., in a vertical direction). The fluid moves within the plural passages of each of the housing bodies (e.g., in a substantially horizontal direction of the plural passages between the broad surfaces of the housing body), and out of the outlet structures toward the outlet conduit, and the outlet conduit directs the fluid in the second direction (e.g., the vertical direction) toward the fluid reservoir housing. For example, the fluid moves within the inlet conduit and the outlet conduit in the same direction. The thermal management system may include the feeder conduit to control a substantially uniform flow path distance of the fluid toward each of the different housing bodies. For example, directing the fluid to move within the inlet conduit in the second direction may control a pressure, a resistance, a pressure drop, or the like, or the portion of the fluid moving in one or more of the housing bodies.

Returning to FIGS. 1-3, during operation of the thermal management system, the inlet conduit may direct a portion of the fluid into one or more of the plural passages of one or more of the housing bodies via the corresponding inlet structure. The fluid may be directed through the plural passages of the housing body and out of the plural passages toward the outlet conduit via the corresponding outlet structure. For example, the outlet conduit may receive the fluid after the fluid is directed through the one or more passages, and may direct the fluid toward one of the chambers of the fluid reservoir housing. In one embodiment, the inlet conduit may be referred to as a supply manifold, such that the supply manifold supplies fluid to the passages of each of the housing bodies, and the outlet conduit may be referred to as a return manifold such that the return manifold returns the fluid to the fluid reservoir housing.

In one embodiment, the thermal management system may be a closed system such that the fluid may be recycled and redirected into and out of the passages of the housing bodies. Optionally, the thermal management system may be an open fluid system such that the fluid may be directed out of the outlet conduit and may be expelled as waste, may be directed to another system, or the like. Optionally, the thermal management system may be a hybrid system such that a portion of the fluid may be expelled as waste, and another portion of the fluid may be reused within the system. In one or more embodiments, the fluid reservoir system may include a chiller and/or heater device configured to change a temperature of the fluid before and/or after the fluid is directed into the housing bodies.

In one embodiment, the inlet and/or outlet conduits may receive a fluid and/or direct fluid out of the thermal management system via a fluid control device 126. As one example, the fluid control device may include a valve that may be moved to an open position, such as to drain or remove a portion of the fluid from the inlet and/or outlet conduits. As another example, the valve of the fluid control device may be controlled to direct additional fluid into the thermal management system, such as to control a volume and/or pressure of the fluid within the thermal management system. As another example, the valve of the fluid control device may be controlled while the thermal management system is being cleaned, maintained, and/or repaired. In the illustrated embodiment, the fluid control device is fluidly coupled with the second end of the inlet conduit, but alternatively may be fluidly coupled with another location of the inlet conduit, with the outlet conduit, or the like.

The thermal management system may include plural different devices 122, 124 that may be coupled with one or more of the housing bodies. In one or more embodiments, the devices may be used by the power system to provide power to the system, may be processors of the system, may be energy storage devices of the system, or the like. In one example, one or more of the devices may be energy storage devices, such as batteries (e.g., Lithium-ion batteries, nickel-metal hydride batteries, lead-acid batteries, ultracapacitors, or the like) that may store energy for the power system. The devices may be operably and/or thermally coupled with one or more of the housing bodies, and the fluid moving through the plural passages of the housing bodies may control the thermal energy generated by the devices.

In the illustrated embodiment, each of the housing bodies 110A-F includes a first device 122A-F, respectively, coupled with one broad surface of the housing body, and a second device 124A-F, respectively, coupled with another broad surface of the housing body. Optionally, two or more devices may be disposed on the same broad surface of one of the housing bodies, a broad surface of one or more housing bodies may be devoid a device, or the like. The devices may be thermally coupled with the one or more broad surfaces of the housing bodies. In one embodiment, one or more of the devices may be directly coupled with the housing bodies such as with fasteners, welding, or other coupling methods. For example, the housing bodies may selectively secure the one or more devices in determined positions of the first and second devices, respectively.

During operation of the thermal management system, the fluid moving within the one or more passages exchanges thermal energy with one or more of the devices. For example, the housing bodies may be referred to as heat exchanger plates, such that the fluid may be directed through the passages extending within the plates to exchange thermal energy with the devices.

In one embodiment, the housing bodies may be manufactured of a material (e.g., metal, metallic alloy, composite, or the like) that may withstand additional weight of one or more devices being coupled directed with the housing body. For example, the housing bodies may provide mechanical stiffness for supporting the weight of the devices. Additionally or alternatively, the thermal management system may include a device securing system (e.g., brackets, frames, coupling features, or the like) that may selectively secure the devices with the device securing system. Optionally, the housing bodies, or a portion of one or more housing bodies, may be manufactured of a material, or a portion of the housing bodies may be selectively manufactured of a material, in order to provide an electrical ground for one or more of the devices. Optionally, the housing bodies may be manufactured of a non-conductive material, and may provide electrical isolation between the plural different devices. Optionally, the housing bodies may be manufactured of a conductive material, and may include a dielectric coating, film, or other insulating layer selectively disposed on a portion of one or more exterior surfaces of the housing body based on the devices coupled with the housing body.

In one embodiment, the thermal management system may be referred to as a modular thermal management system. For example, housing bodies may be added to or separated from the thermal management system based on thermal conditions of the power system in which the thermal management system is used. The thermal conditions may be based on a number of devices generating thermal energy, sizes of the different devices, amounts of thermal energy the different devices may generate, or the like. For example, the thermal management system illustrated in FIG. 1 includes six housing bodies vertically aligned with each other in the vertical direction, and plural devices coupled with one or more of the housing bodies. Optionally, the power system in which the thermal management system is used may require less than twelve or more than twelve devices to be used within the power system. For example, the power system may require twenty devices to be used to provide power to the power system, and additional housing bodies may be coupled with or added to the thermal management system to control the thermal energy generated by the twenty devices. The additional housing bodies may be added to the thermal management system from the top side and/or the bottom side of the thermal management system, and may be aligned with the other housing bodies in the vertical direction.

In one or more embodiments, the thermal management system may include a controller 106 that may control operation of the thermal management system. In the illustrated embodiment, the controller is disposed in the fluid reservoir housing, but alternatively may be positioned at another location. The controller may control one or more settings of the thermal management system (e.g., positions of valves, levels of pumps, or the like) to control one or more characteristics of the fluid moving within the thermal management system. The characteristics may include, but may not be limited to, pressure, flow rate, flow volume, volumetric flow rate, direction, turbulence, or the like. In one embodiment, the controller may control operation of one or more valves (not shown) of the fluid reservoir housing that may allow or prohibit the fluid to be directed into the inlet conduit, to control an amount of the fluid directed into the inlet conduit, to control an amount of the fluid directed out of the outlet conduit, control an amount of fluid directed into each of the different housing bodies, control characteristics of the fluid moving with each of the different housing bodies (e.g., fluid moving within the first housing body may have a pressure that is greater than fluid moving within the second housing body, or the like), or the like. For example, the controller may control characteristics of a first portion of the fluid moving within a first set of the plural passages within the first housing body, and may control characteristics of the fluid moving within a second set of the plural passages within the second housing body. The characteristics of the portions of the fluid moving within the first set of the plural passage may be substantially the same or different than the characteristics of the portions of the fluid moving within the second set of the plural passages based on thermal conditions of the first and second housing bodies, respectively.

In one or more embodiments, the controller may control a setting of the chiller and/or heater device to control a temperature of the fluid that is directed into the inlet conduit, control a temperature of the fluid that is received into the fluid reservoir housing from the outlet conduit, control a fluid directed into the thermal management system via the fluid control device, or the like.

In one or more embodiments, one or more sensors (not shown) may be disposed proximate to or may be operably coupled with the thermal management system. The controller may receive sensor data from the one or more sensors that may indicate thermal conditions of the thermal management system, thermal conditions at different locations within the thermal management system (e.g., conditions of each of the housing bodies, conditions of different portions of the different housing bodies, conditions of the different devices, or the like). The controller may change a setting of the thermal management system (e.g., setting of one or move valves, setting of a chiller/heater device, or the like) to change one or more characteristics of the fluid moving within the system based on the thermal conditions of the thermal management system. For example, the controller may dynamically change a valve setting to reduce an amount of the fluid directed into the conduit based on an amount of thermal energy generated by the devices decreasing. Alternatively, the controller may change a valve setting to increase an amount of the fluid directed into the inlet conduit based on an amount of thermal energy generated by the devices increasing. Optionally, the controller may control one or more flow characteristics of the fluid to direct a different volume of a portion of the fluid to a particular location within the thermal management system. For example, one device may be generating an amount of thermal energy that is greater than other devices, and the controller may control one or more valves to change a volume of the fluid that is directed toward the device generating the greater amount of thermal energy, change a temperature of the fluid that is directed toward the device, change a flow rate of the fluid directed toward the device, or the like.

Figure 10:
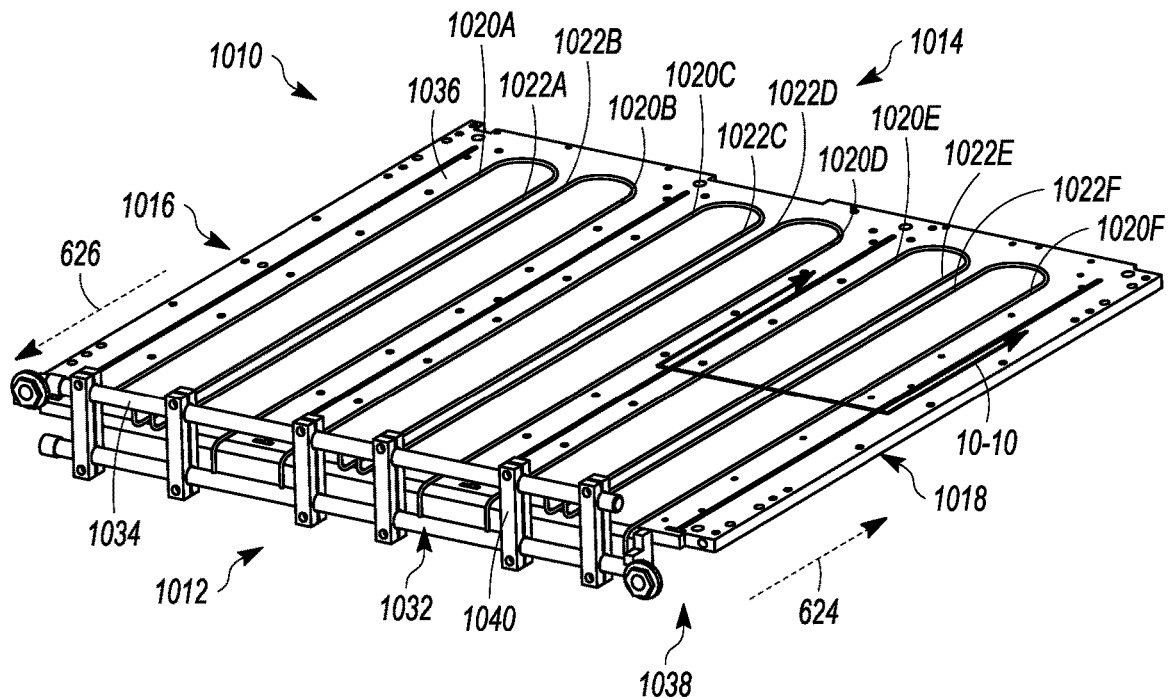
FIG. 10 illustrates a perspective view of a housing body of a thermal management system in accordance with one embodiment.
Figure 11:
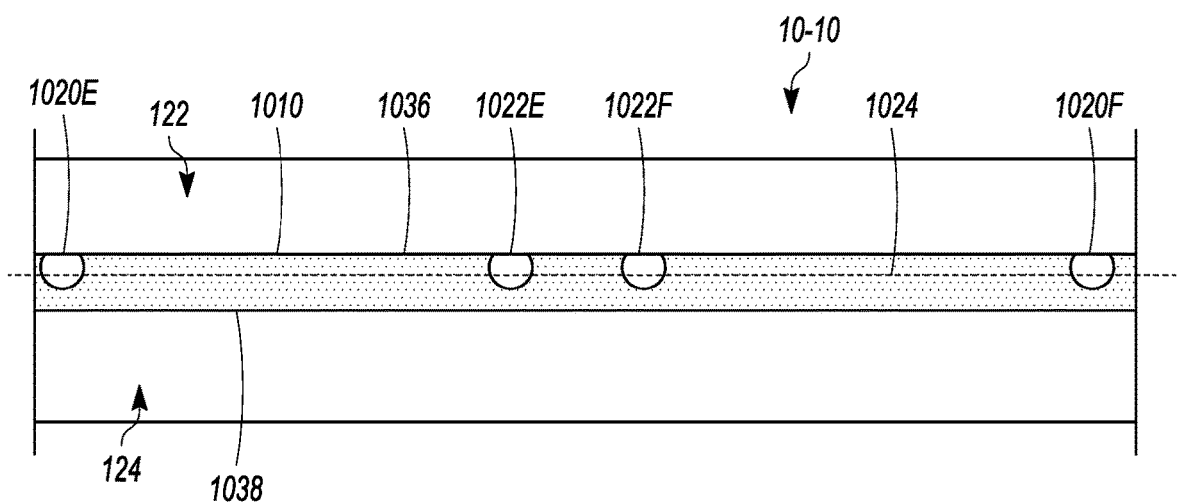
FIG. 11 illustrates a cross-sectional view of the housing body shown in FIG. 10.

In one or more embodiments, one or more of the plural passages of a housing body may be disposed at different elevational positions between a first broad surface and an opposing second broad surface of the housing body. For example, FIG. 10 illustrates a perspective view of a housing body 1010 of a thermal management system in accordance with one embodiment. FIG. 11 illustrates a cross-sectional view 10-10 of the housing body shown in FIG. 10. The housing body extends between a first end 1012 and an opposing second end 1014, a third end 1016 and an opposing fourth end 1018. The housing body includes a first broad surface 1036 and an opposing second broad surface 1038. The housing body includes plural first passages 1020A-F that direct portions of the fluid in the third direction 624, and plural second passages 1022A-F that are fluidly coupled with the plural first passages and direct portions of the fluid in the fourth direction 626.

A first device 122 is operably and/or thermally coupled with the first broad surface, and a second device 124 is operably and/or thermally coupled with the second broad surface. In the illustrated embodiment, the first and second devices are secured with the thermal management system via a device securing system 1040 that includes plural mounting features disposed proximate the first end of the housing body. The first and second devices may be coupled with the plural mounting features of the device securing system that may hold or maintain the position of the first and second devices. The device securing system includes six mounting features, but may alternatively include more than six or less than six mounting features. In the illustrated embodiment, the plural mounting features are also operably coupled with an inlet feeding passage 1032 and an outlet feeding passage 1034 such that the device securing system maintains or holds positions of the inlet and outlet feeding passages, respectively.

As shown in FIG. 11, a center axis 1024 of the housing body extends between the first and second broad surfaces. The view 10-10 includes the first passages 1020E, 1020F, and the second passages 1022E, 1022F. In the illustrated embodiment, the first and second passages are offset from the center axis of the housing such that the first and second passages are closer to the first broad surface and further away from the second broad surface. In one embodiment, the first and second passages may be disposed closer to the first broad surface and further away from the second broad surface based on the first device and the second device, and an amount of thermal energy generated by the first device relative to an amount of thermal energy generated by the second device. Optionally, the first and/or second passages may be offset from the center axis of the housing body based on the type or classification of the first and/or second devices. For example, the first device may have a greater priority relative to a priority of the second device. For example, it may be more important to control the thermal energy of the first device, and less important to control the thermal energy of the second device. Optionally, the first and/or second passages may be offset from the center axis based on a vertical position of the housing body within the thermal management system. For example, the housing body may be disposed at one end of a vertical direction of the thermal management system (e.g., proximate the top side 146 shown in FIG. 1), may be disposed proximate a top or bottom side of the thermal management system, or the like.

Figure 12:
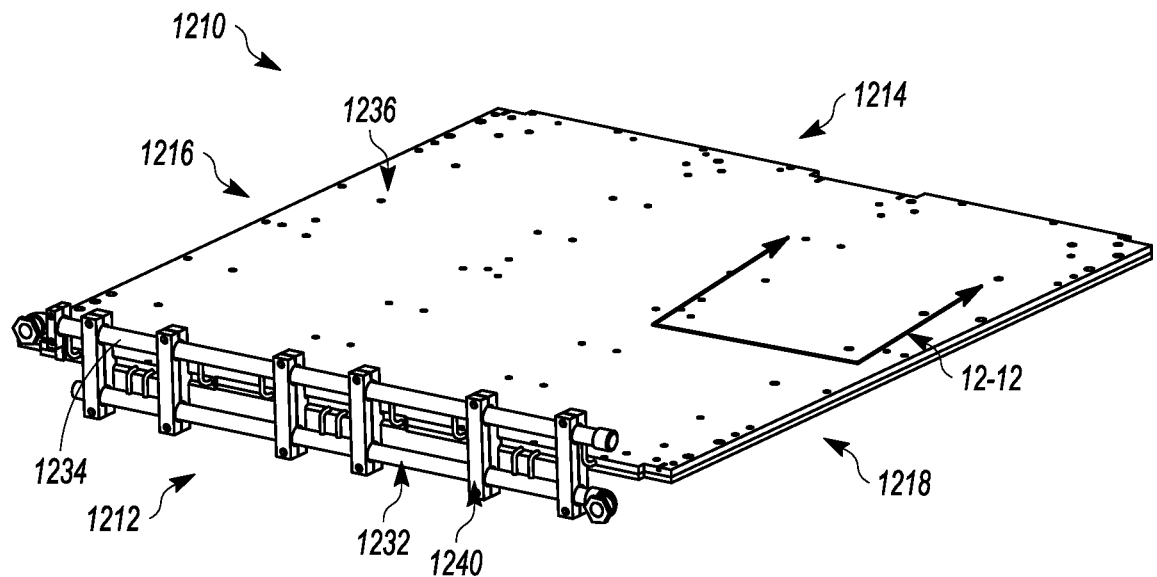
FIG. 12 illustrates a perspective view of a housing body of a thermal management system in accordance with one embodiment.
Figure 13:
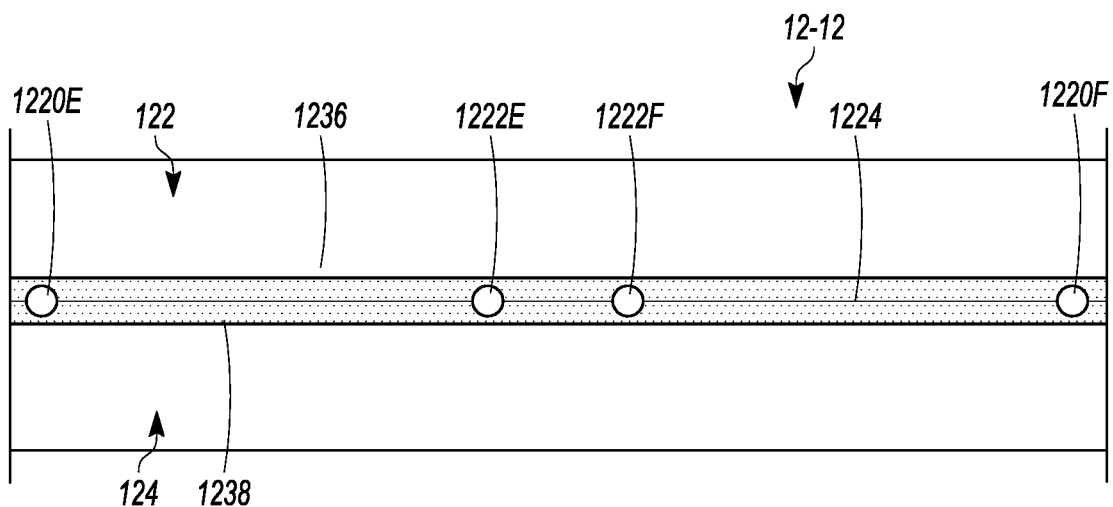
FIG. 13 illustrates a cross-sectional view of the housing body shown in FIG. 12.

Alternatively, the first and/or second passages may be disposed and extend substantially along a center axis of the housing body. For example, FIG. 12 illustrates a perspective view of a housing body 1210 of a thermal management system in accordance with one embodiment, and FIG. 13 illustrates a cross-sectional view 12-12 of the housing body shown in FIG. 12. Like the housing body shown in FIGS. 10 and 11, the housing body shown in FIGS. 12 and 13 extends between a first end 1212 and an opposing second end 1214, a third end 1216 and an opposing fourth end 1218, and includes a first broad surface 1236 and an opposing second broad surface 1238. The first device 122 is operably and/or thermally coupled with the first broad surface, and the second device 124 is operably and/or thermally coupled with the second broad surface.

As shown in FIG. 13, a center axis 1224 of the housing body extends between and is substantially parallel with the first and second broad surfaces. The view 12-12 shown in FIG. 13 includes first passages 1220E, 1220F, and second passages 1222E, 1222F. The first passages each direct a portion of the fluid in a direction from the first end of the housing body toward the second end of the housing body, and the second passages, fluidly coupled with the first passages, direct the portion of the fluid in a direction from the second end of the housing body toward the first end. In the illustrated embodiment, the first and second passages are vertically aligned with the center axis such that the first and second passages are disposed proximately equal distances away from the first broad surface and the second broad surface, respectively. For example, the center axis extends substantially through a center of the first and second passages.

Figure 14:
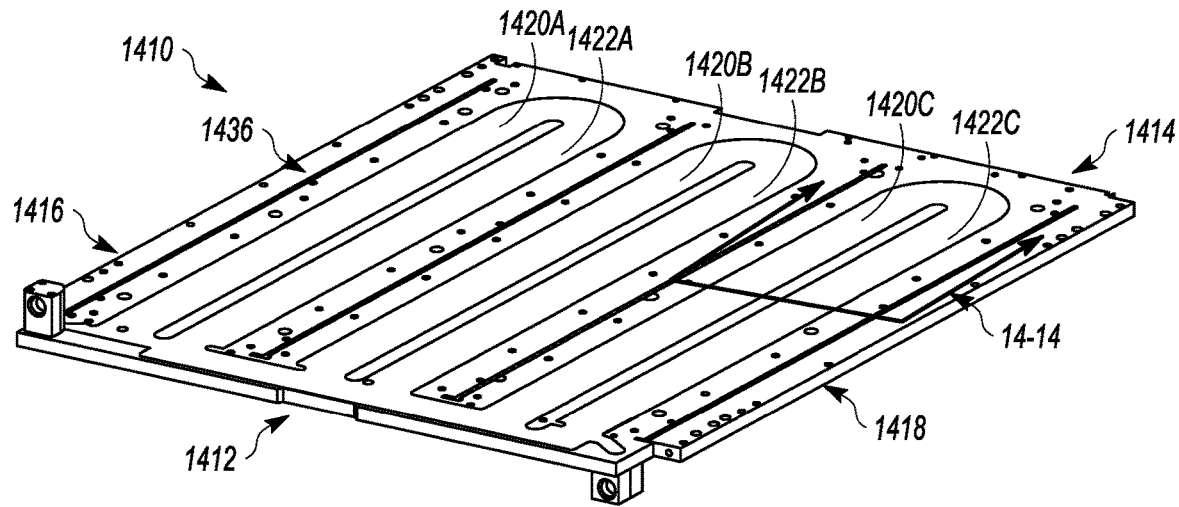
FIG. 14 illustrates a perspective view of a housing body of a thermal management system in accordance with one embodiment.
Figure 15:
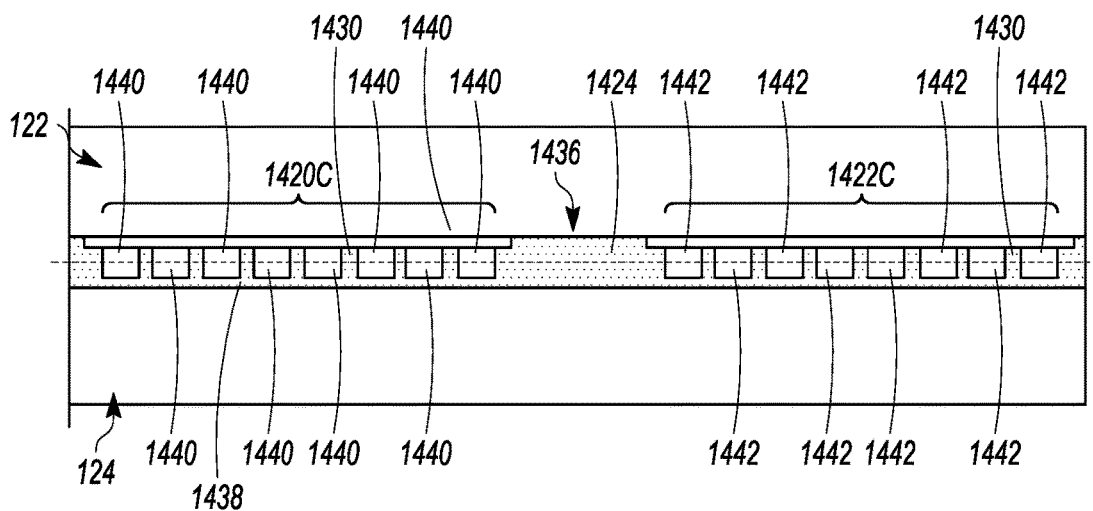
FIG. 15 illustrates a cross-sectional view of the housing body shown in FIG. 14.

Optionally, the plural passages of the housing body may have an alternative configuration. For example, FIG. 14 illustrates a perspective view of a housing body 1410 of a thermal management system in accordance with one embodiment, and FIG. 15 illustrates a cross-sectional view 14-14 of the housing body shown in FIG. 14. Like the housing bodies shown in FIGS. 10 and 12, the housing body extends between a first end 1412 and an opposing second end 1414, a third end 1416 and an opposing fourth end 1418, and includes a first broad surface 1436 and an opposing second broad surface 1438. The first device 122 is operably and/or thermally coupled with the first broad surface, and the second device 124 is operably and/or thermally coupled with the second broad surface.

The housing body includes plural passages 1420, 1422 that may correspond with the plural passages shown in FIG. 7. For example, as shown in FIG. 15, the plural passages may include plural structures 1430 that may define plural sub-passages 1440 of a first passage 1420C, and plural structures that may define plural sub-passages 1442 of a second passage 1422C. In the illustrated embodiment, the first passage also includes a first opening or space 1450, and the second passage includes a second opening or space 1452. For example, the structures may not extend within the first and second openings.

In the illustrated embodiment of FIG. 15, a center axis 1424 extends between and is substantially parallel with the first and second broad surfaces. The plural sub-passages of the first passage are substantially centered with the center axis, and the plural sub-passages of the second passage are substantially centered with the center axis. Additionally, the first and second openings of the first and second passages, respectively, are off-set from the center axis and are disposed proximate to the first broad surface. For example, the first and second openings are disposed closer to the first broad surface relative to the second broad surface. Alternatively, the sub-passages of the first and/or second passages may be off-set from the center axis, the first and/or second openings of the first and/or second passages may be disposed closer to the second broad surface relative to the first broad surface, or any combination therein.

In one or more embodiments, the vertical positioning of the plural passages (and/or different features of the plural passages) between the first and second broad surfaces, the orientation of the plural passages, the volumetric area of the plural passages, or the like, may be arranged to distribute the fluid within the housing body based on an amount of thermal energy generated by one or more of the first or second devices. For example, the positioning of the plural passages may be based on the one or more devices thermally coupled with the first and/or second broad surfaces, priority levels or levels of importance of the one or more different devices thermally coupled with the housing body, amounts of thermal energy generated by the one or more different devices, or any combination therein. In one or more embodiments, a vertical position (e.g., between the first and second broad surfaces) of the first passage may be different than a vertical position of the second passage. Optionally, the number of sub-passages of the first passage may be different than the number of sub-passages of the second passage. Optionally, an area of the first passage may be different than an area of the second passage. Optionally, the first and/or second passages, or the sub-passages of the first or second passages, may be shaped, sized, oriented, or the like, to control one or more characteristics of the portions of the fluid moving within the first and second passages.

The plural passages illustrated in FIGS. 6 through 15 are for illustrative purposes only. The housing body may have any number of passages directing fluid into or out of the housing body that may extend in any direction between the plural surfaces defining the housing body. The passages may have substantially circular cross-sectional shapes, rectangular cross-sectional shapes, oval cross-sectional shapes, or the like. In one or more embodiment, one or more of the passages may include fins coupled with interior surfaces of the plural passages and extending into the plural passages. Optionally, one or more of the passages may include divots or recesses extending away from a center of the passage. Optionally, the housing body may include any alternative structures that may change and/or control the flow of the portion of the fluid that moves within the passages of the housing body.

Figure 16:
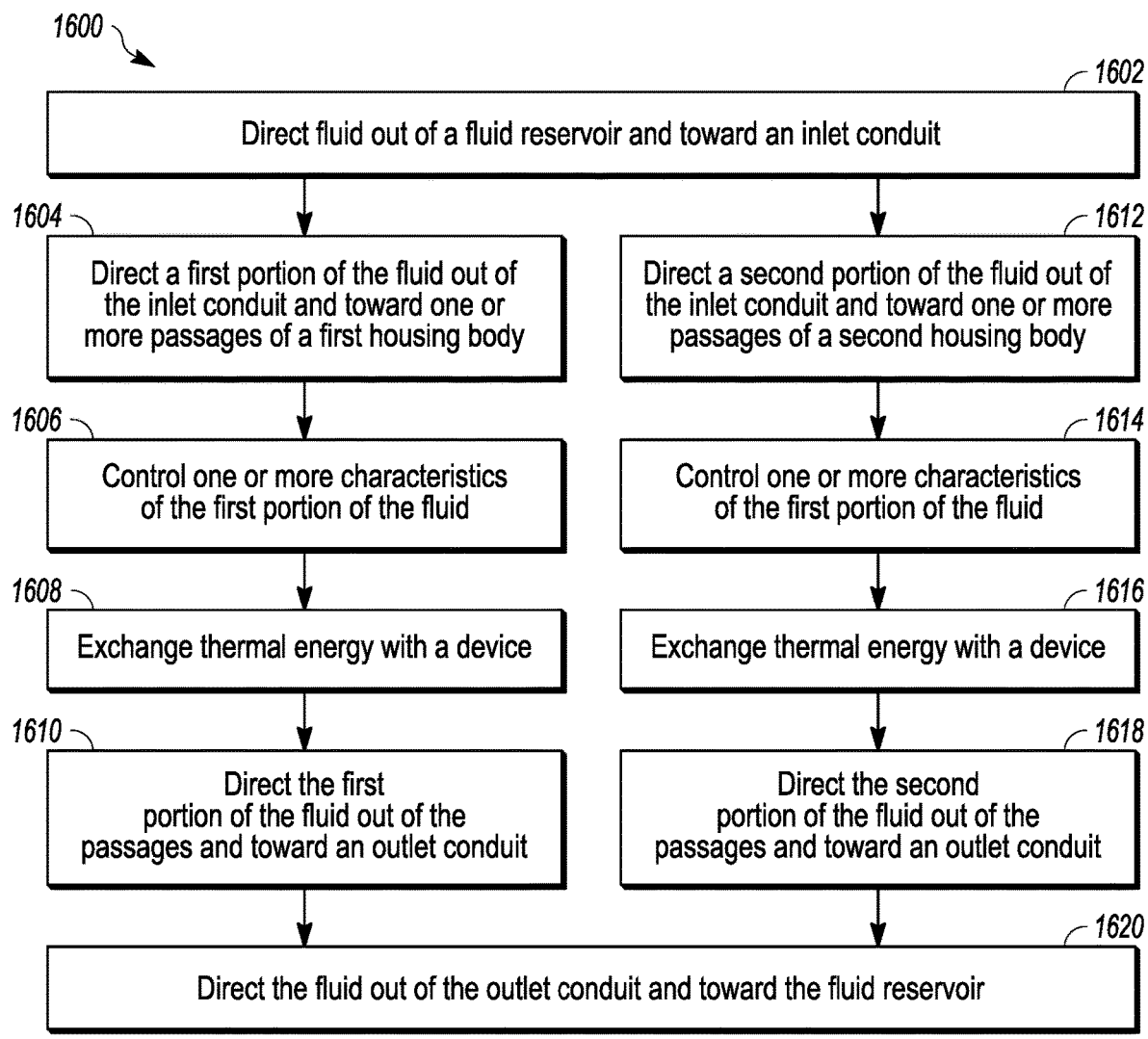
FIG. 16 illustrates a flowchart of a method of controlling operation of a thermal management system in accordance with one embodiment.

FIG. 16 illustrates a flowchart 1600 of one example of controlling operation of a thermal management system in accordance with one embodiment. The thermal management system may be used within a power system such as a vehicle power system (e.g., locomotive, truck, mining vehicle, aerial vehicle, marine vessel, or the like), a stationary power system (e.g., machinery, wind turbine systems, power generating systems, or the like). The thermal management system may be similar to and/or include one or more features of one or more of the embodiments shown in FIGS. 1 through 15. For example, the thermal management system may include plural modular-like housing bodies that may be disposed at different vertical positions relative to each other, and may be thermally and/or operably coupled with one or more devices of the power system.

At step 1602, a fluid may be directed out of a fluid reservoir housing of the thermal management system and toward an inlet conduit. The fluid may be a gas, a liquid, or a gas-liquid mixture. The fluid (e.g., type, phase, or the like) may be based on the type or classification of devices coupled with the thermal management system. At step 1604, a first portion of the fluid may be directed out of the inlet conduit and toward one or more passages of a first housing body of the thermal management system. Additionally, at step 1612, a second portion of the fluid may be directed out of the inlet conduit and toward one or more passages of a second housing body of the thermal management system. In one or more embodiments, the first portion of the fluid may be directed into the first housing body at a time that is before the second portion of the fluid is directed into the second housing body. Optionally, the inlet conduit and/or the passages may be configured to direct the first portion of the fluid into the first housing body at substantially the same time that the second portion of the fluid is directed into the second housing body.

At step 1606, one or more characteristics of the first portion of the fluid may be controlled, and at step 1614, one or more characteristics of the second portion of the fluid may be controlled. In one or more embodiments, a controller of the thermal management system may control one or more settings of the thermal management system to control characteristics of the first portion of the fluid, and characteristics of the second portion of the fluid (e.g., speed, flow volume, pressure, timing of the first and second portions entering the first and second housing bodies, respectively, a level or amount of turbulence, or the like).

At step 1608, the first portion of the fluid may exchange thermal energy with one or more devices thermally coupled with the first housing body, and at step 1616, the second portion of the fluid may exchange thermal energy with one or more devices thermally coupled with the second housing body. In one embodiment, the first housing body may be thermally coupled with a first device but may be thermally separated from a second device, and the second housing body may be thermally coupled with the second device but may be thermally separated from the first device. Optionally, the first and second housing bodies may both be thermally coupled with one or more of the same devices. For example, the first portion of the fluid may exchange thermal energy with the first device, and the second portion of the fluid may exchange thermal energy with the same first device. The one or more devices may be thermally coupled with or thermally separated from the different housing bodies based on distances between the one or more devices and the housing bodies, amounts of thermal energy generated by the one or more devices, sizes of the one or more devices, or the like.

At step 1610, the first portion of the fluid may be directed out of the passages of the first housing body and toward an outlet conduit. Additionally or alternatively, at step 1618, the second portion of the fluid may be directed out of the passages of the second housing body and toward the outlet conduit. At step 1620, the first and second portions of the fluid may be directed out of the outlet conduit and toward the fluid reservoir. In one embodiment, a temperature of the fluid directed back into the fluid reservoir may be controlled, such as to control the temperature of the fluid to allow the fluid to be recycled back within the passages of the first and second housing bodies. In another embodiment, the fluid may be expelled from the fluid reservoir and out of the thermal management system, such as waste. In another embodiment, a portion of the fluid may be recycled within the thermal management system, and another portion of the fluid may be expelled from the system as waste, may be directed to another system, or the like.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one aspect or example, a thermal management system may include a housing body having a first broad surface and an opposing second broad surface and extending between a first end and a second end. The housing body may define plural passages disposed between the first and second broad surfaces. The plural passages may extend in one or more orthogonal directions between the first end and the second end of the body. An inlet conduit may be fluidly coupled with a first passage of the plural passages via an inlet structure that defines an inlet of the housing body. The inlet conduit may direct a fluid into the first passage of the plural passages. An outlet conduit may be fluidly coupled with a second passage of the plural passages via an outlet structure that defines an outlet of the housing body. The outlet conduit may direct the fluid out of the second passage of the plural passages.

Optionally, the first passage may be fluidly coupled with the second passage within the body.

Optionally, during operation of the thermal management system, the fluid exchanges thermal energy with one or more of a first device or a second device. Each of the first and second devices may be thermally coupled with one or more of the first or second broad surfaces of the housing.

Optionally, the first and second passages of the plural passages may be oriented between the first and second broad surfaces to distribute the fluid within the housing body based on an amount of thermal energy generated by one or more of the first or second devices.

Optionally, the housing body may selectively secure the first device and the second device in a determined position of the first and second devices, respectively.

Optionally, one or more of the first passage or the second passage may be positioned at locations between the first broad surface and the second broad surface based on an amount of thermal energy generated by one or more of the first or second devices.

Optionally, a controller may receive sensor data indicative of thermal conditions of the housing body. The controller may control one or more characteristics of the fluid directed into the first passage via the inlet conduit and the fluid directed out of the second passage via the outlet conduit based on the thermal conditions of the housing body.

Optionally, the first passage may include a first group of first passages fluidly coupled with the inlet conduit. The inlet conduit may direct the fluid into the first group of the first passages.

Optionally, the second passage may include a second group of second passages fluidly coupled with the outlet conduit. The outlet conduit may direct the fluid out of the second group of the second passages.

Optionally, a fluid reservoir housing may include one or more surfaces defining one or more chambers disposed within the fluid reservoir housing. A first chamber may be fluidly coupled with the inlet conduit and may direct the fluid toward the inlet conduit and the first passage of the plural passages. A second chamber may be fluidly coupled with the outlet conduit and may receive the fluid from the outlet conduit and the second passage of the plural passages.

Optionally, the inlet conduit may be oriented to control one or more characteristics of the fluid directed into the first passage of the plural passages, and the outlet conduit may be oriented to control one or more characteristics of the fluid directed out of the second passage of the plural passages.

Optionally, the housing body may be a first housing body, and may define a first set of plural passages disposed between the first and second broad surfaces of the first housing body. The thermal management system may include a second housing body having a third broad surface and a fourth broad surface. The second housing body may define a second set of plural passages disposed between the third and fourth broad surfaces of the second housing body. The first set of the plural passages and the second set of the plural passages may be fluidly coupled with the inlet conduit and the outlet conduit.

Optionally, the inlet conduit may be oriented to control one or more characteristics of a first portion of the fluid directed into the first set of the plural passages and one or more characteristics of a second portion of the fluid directed into the second set of the plural passages. The outlet conduit may be oriented to control one or more characteristics of the first portion of the fluid directed out of the first set of the plural passages, and one or more characteristics of the second portion of the fluid directed out of the second set of the plural passages.

Optionally, a controller may receive sensor data indicative of thermal conditions of the first housing body and thermal conditions of the second housing body. The controller may control one or more characteristics of a first portion of the fluid moving through the first set of the plural passages, and one or more characteristics of a second portion of the fluid moving through the second set of the plural passages based on the thermal conditions of the first housing body and the second housing body.

Optionally, the first housing body may be aligned with the second housing body in a vertical direction. The second broad surface of the first housing body may face towards the third broad surface of the second housing body.

In one aspect or example, a method may include controlling one or more characteristics of a fluid directed into a first passage of plural passages. The plural passages may be defined by a housing body having a first broad surface and an opposing second broad surface and extending between a first end and a second end. The plural passages may extend in one or more directions between the first and second ends. One or more characteristics of the fluid directed out of the a second passage of the plural passages may be controlled. The second passage being fluidly coupled with the first passage.

In one aspect or example, a thermal management system may include a housing body having a first broad surface and an opposing second broad surface and extending between a first end and a second end. The housing body may define plural passages disposed between the first and second broad surfaces. The plural passages may extend in one or more directions between the first end and the second end of the body. The housing body may selectively secure one or more devices in a determined position of the one or more devices. The one or more devices may be thermally coupled with one or more of the first broad surface or the second broad surface wherein fluid moving within the plural passages exchanges thermal energy with the one or more device. An inlet conduit may be fluidly coupled with a first passage of the plural passages via an inlet structure that defines an inlet of the housing body. The inlet conduit may direct the fluid into the first passage of the plural passages. An outlet conduit may be fluidly coupled with a second passage of the plural passages via an outlet structure that defines an outlet of the housing body. The outlet conduit may direct the fluid out of the second passage of the plural passages. A controller may receive sensor data indicative of thermal conditions of one or more of the housing body or the one or more devices. The controller may control one or more characteristics of the fluid directed into the first passage via the inlet conduit and the fluid directed out of the second passage via the outlet conduit based on the thermal conditions of the one or more of the housing body or the one or more devices.

Optionally, the housing body may be a first housing body defining a first set of plural passages. The thermal management system may include a second housing body having a third broad surface and an opposing fourth broad surface. The second housing body may define a second set of plural passages extending in one or more directions within the second housing body. The controller may control one or more characteristics of a first portion of the fluid directed into the first set of the plural passages of the first housing body, and one or more characteristics of a second portion of the fluid directed into the second set of the plural passages of the second housing body.

Optionally, the controller may receive sensor data indicative of thermal conditions of the first housing body and the second housing body. The controller may change one or more characteristics of one or more of the first portion of the fluid or the second portion of the fluid based on the thermal conditions of the first housing body and the second housing body.

Optionally, the first housing body may be aligned with the second housing body in a vertical direction such that the first housing body is positioned on top of the second housing body. The second broad surface of the first housing body and the third broad surface of the second housing body face toward each other. The first broad surface of the first housing body and the fourth broad surface of the second housing body face away from each other. The first and second housing bodies may be separated from each other in the vertical direction by the one or more devices operably coupled with one or more of the first or second housing bodies. The first portion of the fluid may be directed into the first set of the plural passages of the first housing body, and the second portion of the fluid may be directed into the second set of the plural passages of the second housing body. The first set of the plural passages are fluidly coupled with the second set of the plural passages via the inlet conduit and the outlet conduit. The inlet conduit and the outlet conduit may extend in the vertical direction between the controller and the first and second housing bodies. The fluid may move in the inlet conduit and the outlet conduit in the vertical direction. The first and second portions of the fluid may move in the first set of the plural passages and in the second set of the plural passages, respectively, in a horizontal direction.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system comprising:
  a housing body having a first broad surface and an opposing second broad surface and extending between a first end and a second end, the housing body defining plural passages disposed between the first and second broad surfaces, the plural passages extending in one or more orthogonal directions between the first end and the second end of the housing body;
  an inlet conduit fluidly coupled with two or more first passages of the plural passages via an inlet structure that defines an inlet of the housing body, the inlet conduit configured to direct a fluid into each of the two or more first passages of the plural passages; [and] an outlet conduit fluidly coupled with two or more second passages of the plural passages via an outlet structure that defines an outlet of the housing body, the outlet conduit configured to receive the fluid from each of the two or more second passages of the plural passages; and
  a fluid reservoir housing comprising one or more surfaces defining one or more chambers disposed within the fluid reservoir housing, wherein a first chamber is fluidly coupled with the inlet conduit and configured to direct the fluid toward the inlet conduit and the two or more first passages of the plural passages, and a second chamber is fluidly coupled with the outlet conduit and configured to receive the fluid from the outlet conduit and the two or more second passages of the plural passages.

2. The thermal management system of claim 1, wherein the first passage is fluidly coupled with the second passage within the housing body.

3. The thermal management system of claim 1, wherein the first broad surface is configured to thermally couple with a first device and the second broad surface is configured to thermally coupled with a second device, the housing body configured to facilitate thermal energy exchange between the fluid and at least one of the first device or the second device.

4. The thermal management system of claim 3, wherein the two or more first passages and the two or more second passages of the plural passages are oriented between the first and second broad surfaces to distribute the fluid within the housing body based on an amount of thermal energy generated by one or more of the first or second devices.

5. The thermal management system of claim 3, wherein the housing body selectively secures the first device and the second device in a determined position of the first and second devices, respectively.

6. The thermal management system of claim 3, wherein at least one of the two or more first passages and at least one of the two or more second passages are located between the first broad surface and the second broad surface based an amount of thermal energy generated by one or more of the first or second devices.

7. The thermal management system of claim 1, further comprising a controller configured to receive sensor data indicative of a thermal condition of the housing body, the controller configured to control one or more characteristics of the fluid directed into each of the two or more first passages via the inlet conduit and the fluid directed out of each of the two or more second passages via the outlet conduit based on the thermal condition of the housing body.

8. The thermal management system of claim 1, wherein the two or more first passages include a first group of first passages fluidly coupled with the inlet conduit, wherein the inlet conduit is configured to direct the fluid into the first group of the first passages.

9. The thermal management system of claim 1, wherein the two or more second passages include a second group of second passages fluidly coupled with the outlet conduit, wherein the outlet conduit is configured to receive the fluid from the second group of the second passages.

10. The thermal management system of claim 1, wherein the inlet conduit is oriented to control one or more characteristics of the fluid directed into the two or more first passages of the plural passages, and the outlet conduit is oriented to control one or more characteristics of the fluid directed out of the two or more second passages of the plural passages.

11. The thermal management system of claim 1, wherein the housing body is a first housing body, the first housing body defining a first set of plural passages disposed between the first and second broad surfaces of the first housing body, the thermal management system further comprising:
a second housing body having a third broad surface and a fourth broad surface, the second housing body defining a second set of plural passages disposed between the third and fourth broad surfaces of the second housing body, wherein the first set of the plural passages and the second set of the plural passages are fluidly coupled with the inlet conduit and the outlet conduit.

12. The thermal management system of claim 11, wherein:
the inlet conduit is oriented to control one or more characteristics of a first portion of the fluid directed into the first set of the plural passages and one or more characteristics of a second portion of the fluid directed into the second set of the plural passages, and
the outlet conduit is oriented to control one or more characteristics of the first portion of the fluid directed out of the first set of the plural passages and one or more characteristics of the second portion of the fluid directed out of the second set of the plural passages.

13. The thermal management system of claim 11, further comprising a controller configured to receive sensor data indicative of a thermal condition of the first housing body and a thermal condition of the second housing body, the controller configured to control one or more characteristics of a first portion of the fluid moving through the first set of the plural passages, and one or more characteristics of a second portion of the fluid moving through the second set of the plural passages based on the thermal condition of the first housing body and the thermal condition of the second housing body.

14. The thermal management system of claim 11, wherein the first housing body is aligned with the second housing body in a vertical direction, wherein the second broad surface of the first housing body faces toward the third broad surface of the second housing body.

15. A method comprising:
controlling one or more characteristics of a fluid directed out of a first chamber of a fluid reservoir housing into two or more first passages of plural passages via an inlet conduit, wherein the first chamber is fluidly coupled with the inlet conduit and configured to direct the fluid toward the inlet conduit and the two or more first passages of the plural passages, the plural passages defined by a housing body having a first broad surface and an opposing second broad surface and extending between a first end and a second end, the plural passages extending in one or more directions between the first end and the second end; and
controlling one or more characteristics of the fluid directed out of two or more second passages of the plural passages via an outlet conduit into a second chamber of the fluid reservoir, wherein the second chamber is fluidly coupled with the outlet conduit and configured to receive the fluid from the outlet conduit and the two or more second passages of the plural passages, each of the two or more second passages fluidly coupled with at least one of the two or more first passages.

16. A thermal management system comprising:
a housing body having a first broad surface and an opposing second broad surface and extending between a first end, a second end, a third end, and a fourth end, the housing body defining plural passages disposed between the first and second broad surfaces, the plural passages extending in one or more directions between the first end and the second end of the housing body, the housing body selectively secures one or more devices in a determined position of the one or more devices, the one or more devices thermally coupled with one or more of the first broad surface or the second broad surface, wherein a fluid moving within the plural passages exchanges thermal energy with the one or more devices;
an inlet conduit fluidly coupled with two or more first passages of the plural passages via an inlet structure that defines an inlet of the housing body, the inlet structure disposed proximate the third end of the housing body and the inlet conduit extending between the third end and the fourth end of the housing, the inlet conduit configured to direct the fluid into each of the two or more first passages of the plural passages;
an outlet conduit fluidly coupled with two or more second passages of the plural passages via an outlet structure that defines an outlet of the housing body, the outlet structure disposed proximate the fourth end of the housing body and the outlet conduit extending between the third end and the fourth end of the housing, the outlet conduit configured to direct the fluid out of each of the two or more second passages of the plural passages;
a controller configured to receive sensor data indicative of a thermal condition of one or more of the housing body or the one or more devices, the controller configured to control one or more characteristics of the fluid directed into each of the two or more first passages via the inlet conduit and the fluid directed out of each of the two or more second passages via the outlet conduit based on the thermal condition of the one or more of the housing body or the one or more devices; and
a fluid reservoir housing comprising one or more surfaces defining one or more chambers disposed within the fluid reservoir housing, wherein a first chamber is fluidly coupled with the inlet conduit and configured to direct the fluid toward the inlet conduit and the two or more first passages of the plural passages, and a second chamber is fluidly coupled with the outlet conduit and configured to receive the fluid from the outlet conduit and the two or more second passages of the plural passages.

17. The thermal management system of claim 16, wherein the housing body is a first housing body defining a first set of plural passages, and further comprising a second housing body having a third broad surface and an opposing fourth broad surface, the second housing body defining a second set of plural passages extending in one or more directions within the second housing body, wherein the controller is configured to control one or more characteristics of a first portion of the fluid directed into the first set of the plural passages of the first housing body, and one or more characteristics of a second portion of the fluid directed into the second set of the plural passages of the second housing body.

18. The thermal management system of claim 17, wherein the controller is configured to receive sensor data indicative of one or more thermal conditions of the first housing body and the second housing body, wherein the controller is configured to change one or more characteristics of one or more of the first portion of the fluid or the second portion of the fluid based on the one or more thermal conditions of the first housing body and the second housing body.

19. The thermal management system of claim 17, wherein the first housing body is aligned with the second housing body in a vertical direction such that the first housing body is positioned on top of the second housing body, wherein the second broad surface of the first housing body and the third broad surface of the second housing body face toward each other, and the first broad surface of the first housing body and the fourth broad surface of the second housing body face away from each other, the first and second housing bodies separated from each other in the vertical direction by the one or more devices operably coupled with one or more of the first or second housing bodies, wherein the first portion of the fluid is configured to be directed into the first set of the plural passages of the first housing body, and the second portion of the fluid is configured to be directed into the second set of the plural passages of the second housing body, and wherein the first set of the plural passages are fluidly coupled with the second set of the plural passages via the inlet conduit and the outlet conduit, the inlet conduit and the outlet conduit extending in the vertical direction between the controller and the first and second housing bodies, wherein the fluid is configured to move in the inlet conduit and the outlet conduit in the vertical direction, and the first and second portions of the fluid are configured to move in the first set of the plural passages and in the second set of the plural passages, respectively, in a horizontal direction.

* * * * *